United States Patent [19]
Hinz et al.

[11] Patent Number: 5,991,626
[45] Date of Patent: Nov. 23, 1999

[54] METHODS AND APPARATUS PERTAINING TO HANDOFF IN A MOBILE TELECOMMUNICATION SYSTEM

[75] Inventors: Udo Hinz, Järfälla; Per Viktor Israelsson, Täby, both of Sweden

[73] Assignee: Telefonakitiebolaget LM Ericsson, Stockholm, Sweden

[21] Appl. No.: 08/922,335

[22] Filed: Sep. 3, 1997

Related U.S. Application Data

[63] Continuation of application No. 08/409,939, Mar. 23, 1995, abandoned, which is a continuation of application No. 08/077,365, Jun. 17, 1993, abandoned.

[30] Foreign Application Priority Data

Jun. 18, 1992 [SE] Sweden .................................. 9201884
Jun. 26, 1992 [SE] Sweden .................................. 9201977

[51] Int. Cl.$^6$ ........................................ H04Q 7/38
[52] U.S. Cl. ........................ 455/436; 455/438; 455/439; 370/331
[58] Field of Search ..................... 455/436, 438, 455/437, 439, 443, 525; 370/331, 332, 333

[56] References Cited

U.S. PATENT DOCUMENTS

| | | | |
|---|---|---|---|
| 4,837,725 | 6/1989 | Yamakawa | 364/807 |
| 4,976,377 | 12/1990 | Higuchi et al. | 222/55 |
| 5,040,215 | 8/1991 | Amano et al. | 381/43 |
| 5,079,704 | 1/1992 | Sakai et al. | 364/424 |
| 5,245,695 | 9/1993 | Basehore | 395/3 |
| 5,432,842 | 7/1995 | Kinoshito et al. | 379/60 |
| 5,596,625 | 1/1997 | LeBlanc | 379/60 |

FOREIGN PATENT DOCUMENTS 424 890   5/1991   European Pat. Off. .

OTHER PUBLICATIONS

IEEE, Li et al. Development of fuzzy algorithms for servo systems Apr. 30, 1989 1603 pp. 65–72.

"An Advanced Air Interface for Integrated Digital Mobile Communications Systems", Masumi Kitagawa et al., *GLOBECOM '91*, IEEE Global Telecommunications Conference, Dec. 2–5, 1991.

Y. Kinoshita et al., "*Advanced Handoff Control Using Fuzzy Inference for Indoor Radio System*", IEEE, pp. 649–653, 1992.

"*Fuzzy Handoff Control Using Learnt Cell Boundary for Radio PBX*", Y. Kinoshita et al.

Primary Examiner—Wellington Chin
Assistant Examiner—Lee Nguyen
Attorney, Agent, or Firm—Burns, Doane, Swecker & Mathis, L.L.P.

[57] ABSTRACT

A method and apparatus in a system comprising cordless telecommunication utilize fuzzy-logic to evaluate at least two radio communication parameters when making a handoff decision, or to produce basic data on which a handoff decision can be made. The parameters are assigned membership to at least two input data sets, each having its own membership function. The parameters are divided into groups and a rule table of fuzzy-condition statements is formed. The fuzzy-condition statements are executed and the consequences weighted to a crisp-value which is used in conjunction with handoff. The inventive apparatus includes a fuzzy-processing unit for grouping parameters and executing rules, a unit for determining the crisp-values, for instance the average value, maximum value and/or the minimum value of rule consequences, and an evaluating unit which uses the crisp-values in conjunction with establishing a candidate list or in making a handoff decision.

9 Claims, 8 Drawing Sheets

FIG. 4a

| VALUE | BS |
|---|---|
| 60 | B6 |
| 50 | B7 |
| 40 | B1 |
| 30 | B5 |
| 25 | B2 |
| 20 | B4 |
| 15 | B3 |

FIG. 4b

| VALUE | BS |
|---|---|
| 67 | B6 |
| 50 | B7 |
| 33 | B1 |
| 30 | B5 |
| 25 | B2 |
| 20 | B4 |
| 15 | B3 |

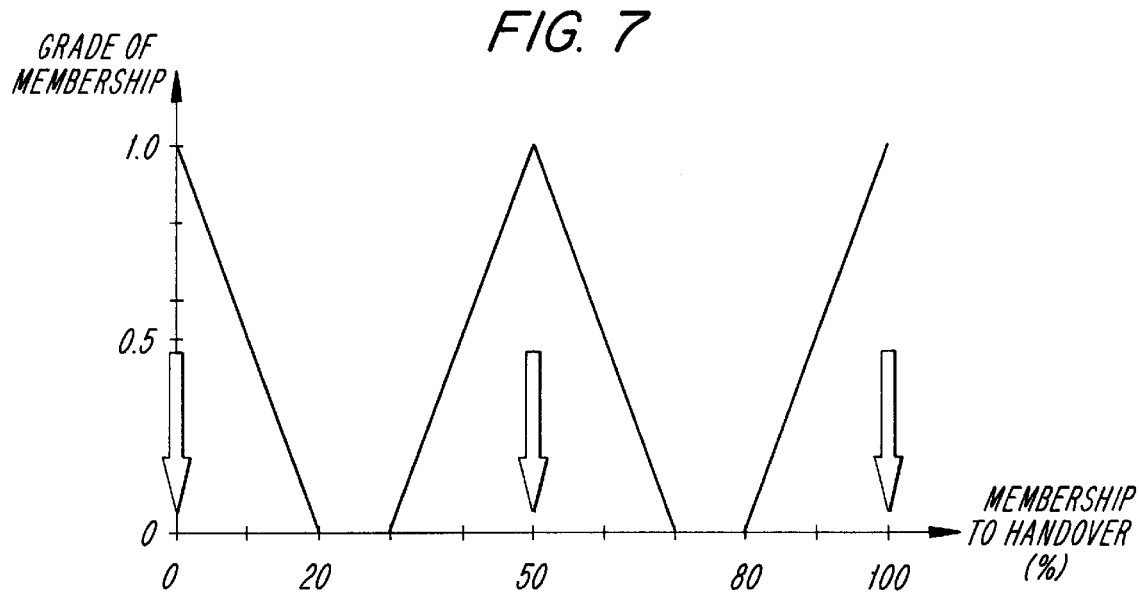
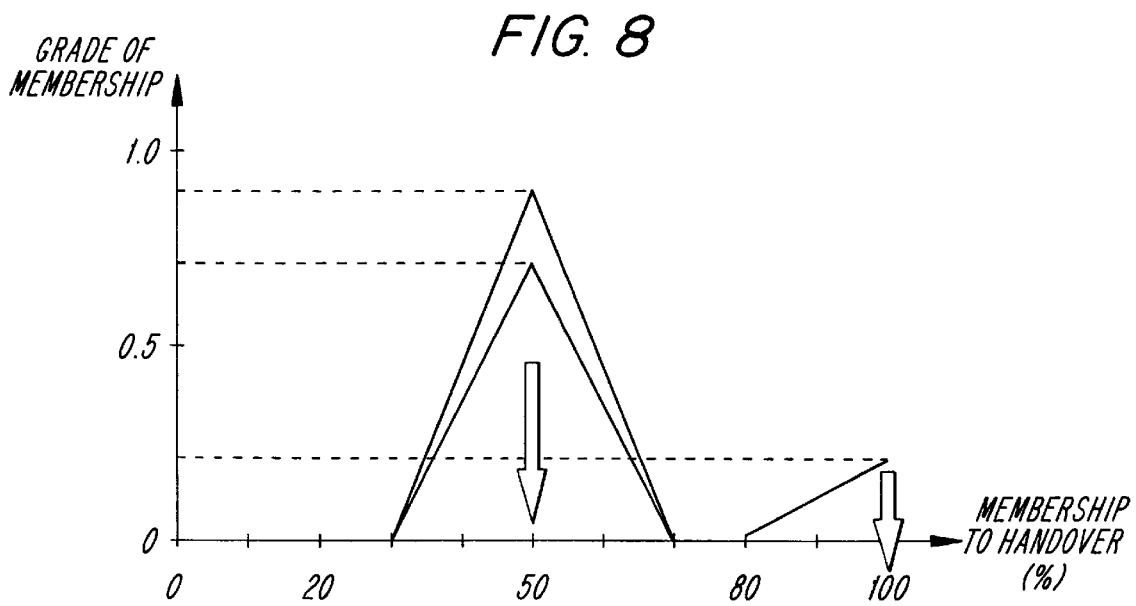

METHODS AND APPARATUS PERTAINING TO HANDOFF IN A MOBILE TELECOMMUNICATION SYSTEM

This application is a continuation of application Ser. No. 08/409,939, filed Mar. 23, 1995, abandoned, [which is itself a File-Wrapper Continuation of U.S. application Ser. No. 08/077,365, filed Jun. 17, 1993, abandoned].

BACKGROUND

The invention relates to a method and apparatus in a system which includes cordless telecommunication. More specifically, the invention relates to a method and to apparatus pertaining to handoff. The inventive method and the inventive apparatus utilize fuzzy logic to evaluate radio communication parameters in conjunction with decisions concerning handoff or producing basic data on which the question of handoff can be decided.

Many different kinds of mobile radio communication systems have been proposed and many kinds of systems are in use. The kinds of systems first suggested and developed were analogue systems. There are plural kinds of analogue systems according to different standards, e.g. those standards normally abbreviated NMT, APMS and TACS. These systems may be classified as FDMA-type systems.

Some systems proposed and developed later than the previously mentioned analogue systems are digital systems or combined analogue and digital systems. There are several kinds of digital systems or combined digital and analogue systems according to different standards, e.g. the European standard, normally abbreviated to GSM, and the U.S. standard TIA IS-54. These systems and other systems such as the recently developed digital system according to Japanese standards may be classified as TDMA-type systems. Other digital systems, e.g. systems according to the draft standard TIA PN 3118 to be published as TIA IS-95, may be classified as CDMA-type systems.

Although mobile radio communication systems may be analogue or digital and may be classified as FDMA or TDMA or CDMA-type systems, they have a number of things in common. One thing which is common to all cellular telecommunication systems that include cordless communication is the need for handoff.

When a mobile station is located in one cell and has a call connection with another mobile station or with a subscriber which has a fixed terminal and uses a base station for the cell concerned for the call connection and moves further and further away from the cell and said base station, it will be impossible sooner or later to use the base station of said cell for the purpose of continuing the call. Sooner or later, it will be necessary to handoff to another base station for another cell.

There may be various reasons for handoff. One obvious reason, which is common to all kinds of systems, is that the strength of the radio signals transmitted by the mobile station may be too weak when received by the base station, due to a very long distance between the mobile and the base station. A similarly obvious reason is that the radio signals transmitted by the base station may be too weak when received by the mobile station, because of a very long distance between the base and the mobile station. Consequently, a highly basic procedure for monitoring the need for handoff would be to monitor the strengths of the signals received by either the base station or the mobile station or by measuring the strength of the signals received at both the base station and the mobile station.

There may be other reasons for handoff. One obvious reason is that noise or interference from radio signals transmitted by other base and mobile stations may make it impossible to understand or reconstruct the information forwarded by the radio signals pertaining to the call or the quality or amount of the information possible to understand or reconstruct may be insufficient for the type of call concerned. A similar reason is that the radio signals transmitted from the base and mobile station for the purpose of the call may cause unacceptable noise or interference on radio signals transmitted from other base and mobile stations for the purpose of other calls.

There may be still other reasons for effecting handoff. One reason is because one cell may tend towards becoming overloaded with desirable calls while a neighbouring cell has free call handling capacity. Mobiles that are located in the vicinity of cell borders may then be ordered to handoff from the overloaded cell to the said other cell.

There, at times, may be circumstances which prevent a handoff which is desirable because of signal strength. One such circumstance may be that there are no free radio channels at that time, or because the handoff may possibly cause an unacceptable increase in noise or interference on other calls. In a FDMA-type system, the number of radio channels is determined by the frequencies, whereas in a TDMA-type system, the number of channels is determined by the time slots of the frequencies. In a CDMA-type system, the number of radio channels is not fixed by a number of frequencies, but is limited by the acceptable maximum level of noise and interference.

In general, a successful handoff requires not only the awareness of the need for handoff but also requires the identification of possible new cell base stations or new radio channels at the same base station, and also a proper selection when more than one alternative exists. Since the majority of cellular systems normally have a hexagonal cell structure, most cells are surrounded by at least six neighbour cells and theoretically, there are at least six cells to choose from.

In some of the existing cellular telecommunication systems, for instance cellular mobile telephone systems, a mobile station (MS) will be in duplex radio contact with a base station (BS) belonging to a serving cell. When signal strength becomes too weak, or when the mobile passes the border to a neighbour cell, handoff can be initiated to a base station which generates stronger signals.

The above description of the handoff procedure is greatly simplified, but the technique behind the procedure is well known in mobile telephony contexts. Variables, parameters, other than signal strength, such as path-loss or BER (Bit Error Rate), may also be determinative in making a handoff decision. Signal strength and BER can be determined or estimated by both MS and BS in a serving cell. BER is used essentially with alarm handoff procedures, i.e., in principle, the "locating"-algorithm processes signal strengths. Alarm handoff is initiated when BER > than a limit value, i.e. signalling quality is so poor as to necessitate immediate handoff, which shunts or by-passes the locating algorithm. The locating algorithm is the process which decides whether a MS shall be coupled to a new cell on the basis of measure data and parameter data. The process results in a list of possible handoff candidates. It should be observed that "intracell"-handoff also occurs, i.e. the mobile switches to another frequency or traffic channel within one and the same cell, for instance when receiving and transmitting conditions are poor.

When a mobile station is in the vicinity of borders between cells handover decisions based on comparison of actual signal strength may cause problems because there may be frequent and rapid changes as regards which signal is the strongest. This might lead to frequent and rapid handoffs back and forth between two base stations for adjacent cells. In order to avoid this a hysteresis is introduced whereby handoff is not done until the signal strength of a candidate base station exceeds the strength of serving base station by a certain amount. Hysteresis is set to equal levels with different signs on both sides of the cell boundaries, precisely for the reason of avoiding the aforesaid handoff back and forth due, for instance, to fading dips or "dead-spots". Since the path losses from the base stations concerned are generally equal, a mobile station MS which crosses a cell border may retain its connection with the serving BS as a result of hysteresis in the signal strength comparison.

It is important that a mobile (MS) is connected to the correct cell in a cell pattern or cluster, such as 3/9, 4/12, 7/21, and so on. This applies particularly to the 3/9 and 4/12 cell pattern, because of the short frequency co-channel reuse distance, which depends on the Carrier-to-Interference ratio problem (C/I). The hysteresis of the cell limits may therefore not be set too high. One problem that can occur when hysteresis is set at a low level is the undesirable handoffs of a MS are not sufficiently avoided.

The overshadowing problem resides in the "locating"-algorithm and the setting of parameter levels, which form the basis for a handoff decision. For instance, 80 parameters may be required with each BS in some cases. Consequently, the "locating"-calculations require comprehensive signalling and calculating capacity in the mobile telephone exchange and between respective switches. By switches is meant here MSCs (Mobile Services Switching Centres) or BSCs (Base Station Controllers).

In certain systems, the "locating"-calculations are effected in the switch part designated TRH (Transceiver Handler), which also organizes candidate lists, i.e. lists which organizes base stations as handoff candidates. The handoff function in the transceiver handler TRH examines the candidate list, allocates and activates a channel and orders the mobile MS to switch to a new channel. Those base stations whose signal strengths are higher than a given lower threshold M, for instance −90 dBm, but lower than an upper threshold K=0, for instance −60 dBm, are ranked in accordance with the K-criterion. In principle, the K-criterion is a ranking from the highest to the lowest signal strength, including a penalty. Those signal strengths which lie beneath the M-value are not ranked. Those base stations whose signal strengths lie above K are considered to have sufficient strength and are ranked in accordance with the L-criterion, which takes, for instance, path loss and penalty into account. A penalty is allocated to base stations which, for instance, have failed to expedite a handoff command. The penalty is often expressed in an additional loss allocation, in the candidate list, to that base station which has failed to expedite a handoff. The penalty is also weighted into the K-criterion, and if the signal strength should lie beneath the M-threshold. Thus, in the case of the L-criterion that base station which has the highest signal strength need not be placed uppermost in the hierarchy. The obtained measurement values are the equalized average values over a given period of time, for instance 480 ms according to GSM.

It will be evident from the description of the background art that, in principle, it is only signal strength that is considered in the "locating"-algorithm and that, in spite of this, it is perhaps necessary to use as many as 80 parameters for a cell "site" (BS physical positioning). When considering the switch capacity that is required, it can be well imagined what problems would arise if further variables were weighted into the "locating"-procedure.

It should be added that some manufacturers of mobile telephone systems do not avail themselves of the "path loss" criterion in the "locating"-algorithm. Some telecommunication companies also have their own signs for switch units (MSC, BSC), although it will be understood that the invention is not restricted solely to systems which have certain criteria or names.

Generally speaking, "fuzzy"-logic is purely a generalization of classic algebra in which two-state Boolean algebra is a set. The "fuzzy"-logic applied by the present invention is called the "max-min-method". The method is based on the use of the logical operators "AND" and "OR" and the complement. The most popular operator, and often the most satisfactory, is the AND-operator. When comparing variables, for instance, in "fuzzy"-logic, there is read-out the $AND \equiv minimum \equiv intersection$, the $OR \equiv maximum \equiv union$ and the complement is as usual. AND selects the min-variable and OR selects the max-variable.

The continued method of procedure is mainly as follows:
a. Allocate at least two sets for each input variable for meaningful comparisons.
b. Allocate each variable set a membership function $\mu_M$, i.e. a function which defines the set. Although not necessarily so, the functions in "fuzzy"-logic often assume values between 0 and 1 on the ordinate (the Y-axis, "co-domain"). In any event, the values are normalized. The domain in which the set assumes the values (preferably normalized) is defined on the abscissa (the X-axis).
c. Set-up linguistic adjectival expressions for comparisons between variables.
d. Form "IF" and "THEN" statements, which are condition statements of the adjectival expressions. "IF" and "THEN" are bound together with the logical operators.
e. All expressions according to d. form a rulebase which is gone through sequentially by the values of the compared variables, parameters (the antecedents in the condition statements).
f. Each rule (condition statement) produces an output value which affects an output set defined through its membership function, $\mu_O$. The output value is designated the "firing-value" or "rule-firing".
g. Those values which occur when the output set is affected or influenced are called consequences.
h. All consequences are weighed together, normally according to one of the following three evaluation methods "Max-Height", average value method ("Average") or "centroid"-method ("Centre of Gravity", "Momentum"), which produce the "crisp"-value for any further evaluation. In the case of the present invention, the "crisp"-values are used to update the candidate list.

The method of procedure with regard to the centroid method is defined remarkably well in Patent Application No. EP-A 2,424,890 which is incorporated here by reference. This document also discloses the state of the art with regard to "fuzzy"-hardware and data communication between included units, and is considered hereafter as known, particularly when it is mentioned in the present Application that the hardware can comprise a control unit, an application memory for sequential user instructions and "fuzzy"-conclusion instructions.

The use of either standard circuits or ASICS for implementation of fuzzy-logic is discussed in ELEKTRONIK I NORDEN, No 9, 1993, part two, page 46–47, Fuzzy-logik med standardkretsar eller Asic.

An attempt to use "fuzzy"-logic within mobile telephony technology has been published as "Handoff Control Using Learnt Cell Boundary for Radio PBX", authors Y. Kinoshita, et al, Dept. of Electrical and Electronics Engineering Chiba University, Chiba, 260 Japan. This document describes the use of "fuzzy"-logic in the form of a method for mapping the surface of a cell in X and Y coordinates and for Learning the cell area by simulations with "fuzzy"-logic. Thus, "fuzzy"-logic is not used for handoff decisions actively and in real time.

Another suggestion to use fuzzy-logic in mobile communication systems is described in IEEE Global Telecommunications Conference. GLOBECOM '91, Conference Record (Cat. No 91CH2980-1) Volume 2, M. Kitagawa, K. Ohno, A. Kaiyama, "AN ADVANCED AIR INTERFACE FOR INTEGRATED DIGITAL MOBILE COMMUNICATIUONS SYSTEMS" page 1474–1479. According to this document fuzzy-logic is not used for handover decision but for determining in which cell a mobile is located.

SUMMARY

The method and apparatus according to the present invention seek to replace or simplify the "locating"-procedure with "fuzzy-logic" technique, so that several variables and parameters can be weighed together in making a handoff decision. In this way, a soft handoff decision is reached, i.e. unnecessary temporary decisions can be avoided. "fuzzy"-hardware and/or "fuzzy"-software function in accordance with the minimum specification principle, and are said to imitate the manner in which information is judged by a human being, and hence situations such as those occurring in the "locating"-algorithm including many comparisons are avoided to a large extent. It is also possible to minimize the requisite software. "fuzzy"-software can be realized in pure "fuzzy"-hardware. This is a strength in the development of new systems, methods, products, etc., i.e. development and testing are affected with software. When development and simulations are effected with desired results, the hardware is produced on the basis of the software, for instance via the source code, therewith greatly reducing the time lapse from the concept-stage to the finished product. When "fuzzy"-logic introduces soft decisions, the hysteresis can be minimized or, if desired, dispensed with. However, it is sometimes desirable to introduce hysteresis in order to bridge obstacles in the terrain.

The following variables and parameters, measured by mobiles and/or base stations, can be used as input data in an inventive "fuzzy"-method and for an inventive "fuzzy"-arrangement:

a. RXLEV_DL≡Receiver level-DownLink (BS to MS), which is the strength of the signals received at the mobile stations. This reported value extends from 0 . . . 63, where 0 represents −110 dBm and 63 represents −48 dBm.

b. RXLEV_UL≡Receiver Level_UpLink (MS to BS), which is the strength of the signals received by the base stations. The input reported values according to RXLEV_DL above.

c. RXLEV_NCELL(n)≡Receiver Level_Neighbouring Cell (n), which is the signal strength measured in MS from a neighboring cell No. n. The input reported value according to RXLEV_DL above. Although the candidate list normally contains only 6 neighbour cells, the mobile shall be capable of measuring the signal strength of 32 neighbour cells, for instance in the GSM system.

d. RXQUAL_DL≡Receiver Quality_DownLink. This variable represents estimated BER with regard to data bursts received by MS. The input reported values extend from 0 . . . 7, where 0 is smaller than 0.2% and 7 corresponds to more than 12.8%.

e. RXQUAL_UL≡Quality_UpLink, which represents estimated BER on data received by BS. The same extension (area) as for RXQUAL_DL above.

f. TA≡Timing (Advance or Alignment) is the measured distance between MS and BS. The distance is measured from the propagation time between MS and BS.

g. Stored parameters as transmitted power from neighbour base stations, path loss, C/I, C/A, C/R, where C≡Carrier, I≡Interference, A≡Adjacent, R≡Reflexion, and other parameters specified in the GSM recommendation under, for instance, GSM Recom. 03.03, 04.08 and 05.08 ("locating"-algorithm).

In principle, the invention is system-independent and may, in principle, be applied in all systems in which handoff takes place, provided that variables, parameters, are adapted to the intended system and its recommendations. Examples of systems in which methods and apparatus according to the invention may conceivably be implemented include systems according to the standards GSM, TIA IS 54, JDC, NMT 450, NMT 900, DECT, C-NETZ, AMPS, TACS, N-AMPS, CT-3.

At least two variables or parameters shall constitute input data for a "fuzzy"-hardware system, a combination of "fuzzy"-hardware and "fuzzy"-software, or purely "fuzzy"-software. It should be observed that when not concerned with intracell-handoff, RXLEV_NCELL(n) will preferably be an input variable, since the strength of signals from neighbouring cells is the most important variable in intercell-handoff (handoff to another cell).

According to the present invention, when the input data includes many variables or parameters, these input variables and parameters are divided into groups of at least two variables and/or parameters. These variables and/or parameters may occur individually in more than one group, and may even be duplicated, triplicated, etc., and then with the values from different measuring time points. Each group produces output data in the form of a "crisp"-value. According to the invention, the output data of the group or groups is then processed by a unit (A\C\M\M). This unit forms from the individual "crisp"-values average values, complement values, maximum values and minimum values. These values formed by the unit A\C\M\M are used for handoff-evaluation in an inventive handoff-evaluating device HED, which updates the candidate list used in existing systems or a candidate list according to the present invention. It should also be observed that it is possible to provide the evaluation process with all variables, parameters, rule consequence values and rule "firing-values" for possible evaluation together with those values produced by the A/C/M/M unit and with the parameters values obtained from MSC or BSC.

BRIEF DESCRIPTION OF THE DRAWINGS

FIGS. 4a and 4b illustrate candidate lists for a mobile station;

FIG. 7 illustrates output functions for handover;

FIG. 8 illustrates use of the center of gravity method;

DETAILED DESCRIPTION

Figure 1:
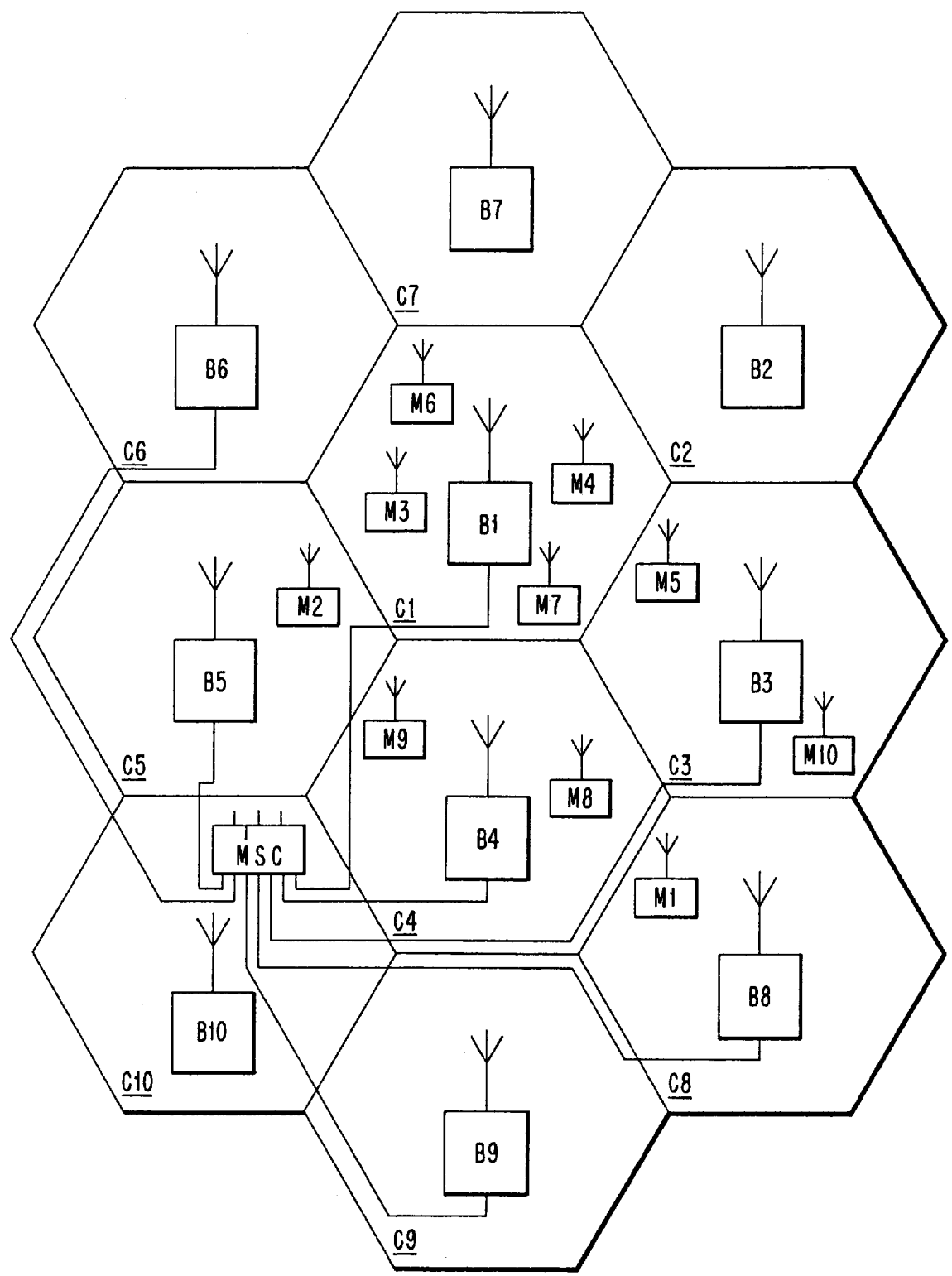
FIG. 1 illustrates a cellular mobile telephone system comprising base stations and mobile stations.

FIG. 1 illustrates ten cells, C1 to C10, of a cellular mobile radio system. Each cell C1 to C10 has a respective base station, referenced B1 to B10. The base stations are situated in the centre of respective cells and have omnidirectional antennas. All base stations are connected to a mobile radio switch MSC, including cables or other fixed information transmission means, for instance radio links. The mobile radio switch MSC is also connected to a fixed telecommunication network by means of cables or links. Neither the fixed telecommunication network nor all the cables or links between the mobile radio switch have been shown in FIG. 1, for the sake of clarity.

Also shown in FIG. 1 are ten mobile stations, referenced M1 to M10. The mobile stations may be small, lightweight portable mobile stations, for instance pocket telephones, or more bulky mobile stations installed in engine-driven vehicles and supplied with current from the vehicle electrical system.

When in an operational mode, the mobile stations are able to communicate with the fixed part of the mobile radio system, by receiving radio signals from the bass stations and/or by transmitting radio signals to the base stations. Connections for telephone calls, telefax messages, data transmission or for the transmission of other information can be established between one of the mobile stations and another of said mobile stations or a subscriber in the fixed telecommunication network. Group call connections for three or more parties can also be established. The term connections used in this document implies all types of connections that are capable of being established and where at least one mobile station transmits or receives information via a connection, irrespective of whether the connection is a connection with one or more parties in the fixed network or a connection with one or more other mobile stations, and irrespective of whether the establishment of the connection has been initiated by a mobile station or by a subscriber in the fixed network.

The mobile radio system illustrated in FIG. 1 is a simplified version of the majority of mobile radio systems. This simplification has been made in order to enable the invention to be understood more readily. Normally, a mobile radio system will include more cells and more base stations than those illustrated. The cell structure may also be more complicated than that shown, and may include umbrella cells which cover an area which is also covered by a number of microcells. It is usual to place base stations with sector antennas in the immediate proximity of cell boundaries. It is also conceivable for certain cells to be served by more than one bass station. The system may also include more than one mobile radio switching centre, wherewith certain of the base stations are connected to different mobile radio switching centres. Finally, the cellular mobile radio system will normally comprise more than ten mobile stations.

The mobile stations are movable within a cell and also from one cell to another. Depending on where a mobile station is located and on existing connections with other mobile stations, prevailing radio signal propagation conditions and radio interferences a need will arise for the use of another base station for an established connection with the mobile station. In order to change base stations, so-called handoff it is necessary to have available basic data on which a decision can be made, so that the station concerned will be aware of when a change shall be made and to which base station handoff shall be effected.

In order to obtain this basic handoff decision data, a mobile station which has an established connection determines the values of the parameters of received radio signals, by measuring or estimating said parameters, and reports the results of said measurements or estimations to the base station which serves the mobile station concerned. The mobile station will normally receive radio signals from its own base station, i.e. the base station serving said mobile station, and also from other neighbouring base stations. The reported values will then relate to the values of the parameters of the radio signals received from some of these neighbouring base stations. The mobile stations may also report the parameter values which have been determined in some way other than by measuring or estimating the parameters of received radio signals, for instance parameters relating to the power at which the mobile station transmits at that moment in time, which values can also be used basic handoff data.

The base stations also determine the values of the parameters of radio signals received from mobile stations, by measuring or estimating on the basis of the received radio signals. The base stations can also determine the values of parameters in ways other than by measuring radio signals.

It is also conceivable that devices other than base stations and mobile stations in a system which includes cordless telecommunication are able to determine the parameter values as a basis on which handoff is decided in the mobile radio system. For instance, if the mobile radio system has more than one mobile radio switching centre connected to the telecommunication network, it is conceivable in some cases that the traffic conditions in the telecommunication network will be significant to the choice of mobile radio switching centre and therewith the choice of a bass station, when so is possible.

It is known to evaluate the basic data for a handoff decision and to make a handoff decision in different parts of a mobile radio system. In certain mobile radio systems configured in accordance with FIG. 1, this is effected solely by the mobile radio switching centre or by corresponding devices. In other mobile radio systems according to FIG. 1, this is effected to a greater or lesser extent in respective base stations. As opposed to the FIG. 1 system, the bass stations of certain mobile radio systems are connected in groups to controllers, so-called base station controllers, which in turn are coupled to means which correspond in part to the mobile radio switch shown in FIG. 1. In systems such as these, handoff evaluating and decision-making procedures can be effected by these base station controllers, to a greater or lesser extent.

The devices and means used for measuring and estimating radio signal parameters and reporting parameter values within a mobile radio system are well known to the art. With regard to the inventive method and the inventive apparatus, it is normally irrelevant, or at least of lesser importance, whether the evaluation of parameters is effected, either totally or in part, by respective bass stations or bass station controllers or mobile radio switches or corresponding devices in the telecommunication system. Consequently, neither the establishment of parameter values nor the reporting of parameter values to those devices which utilize said values or perform evaluation and decision-making procedures will be described in detail here.

Figure 2:
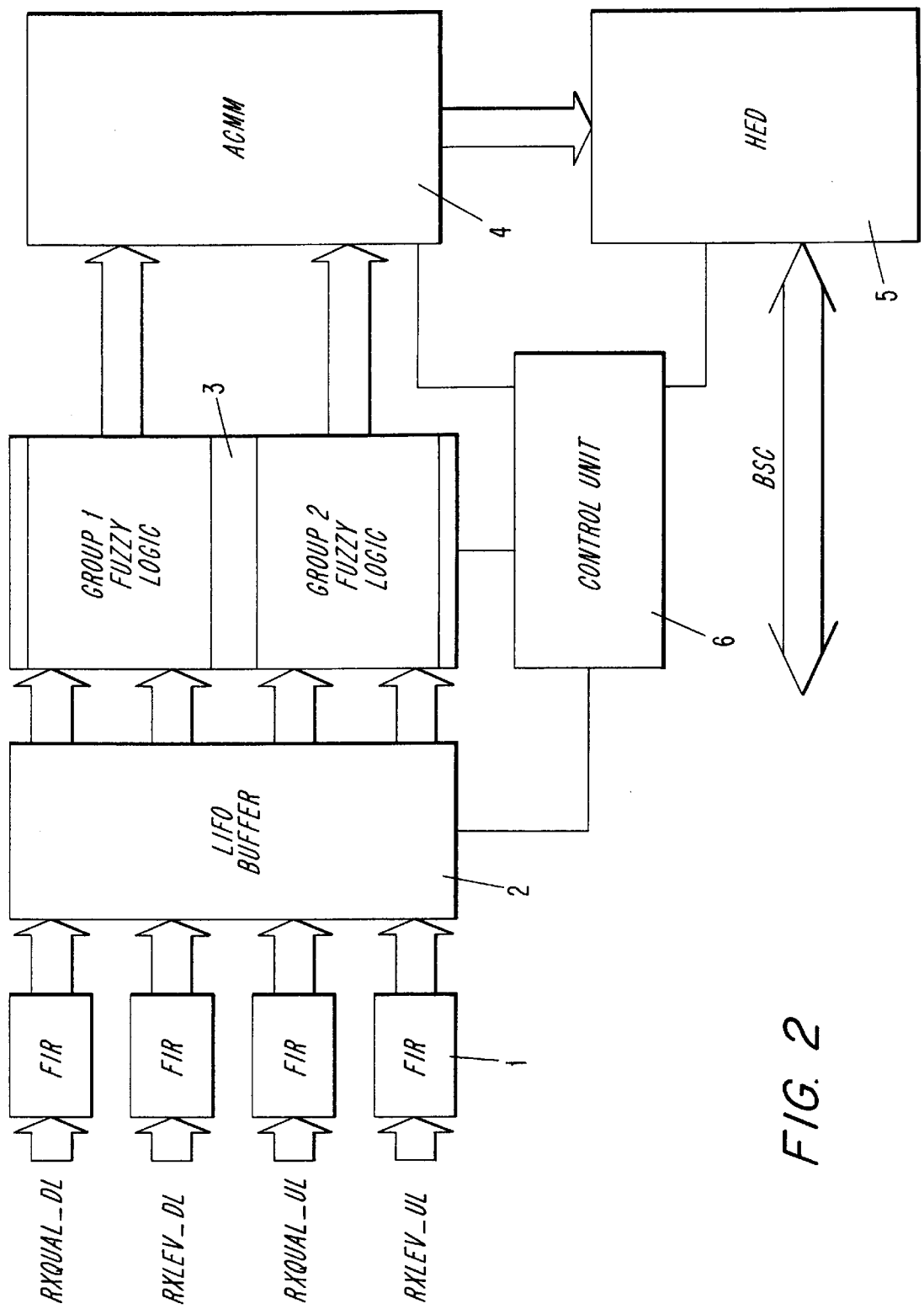
FIG. 2 illustrates an exemplifying embodiment of an inventive "fuzzy"- hardware system.
Figure 3A:
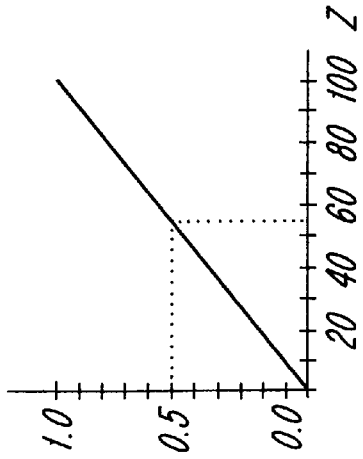
FIGS. 3(a, b, c, d, e, f) illustrates the evaluation of two "fuzzy"-rules with their respective membership functions.
Figure 3B:
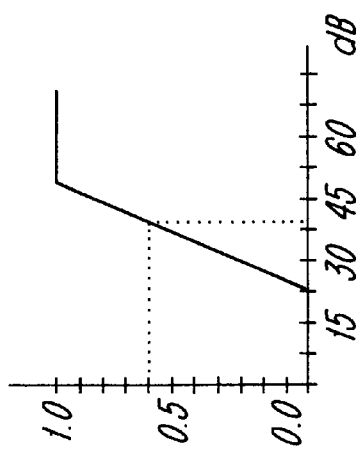
Figure 3C:
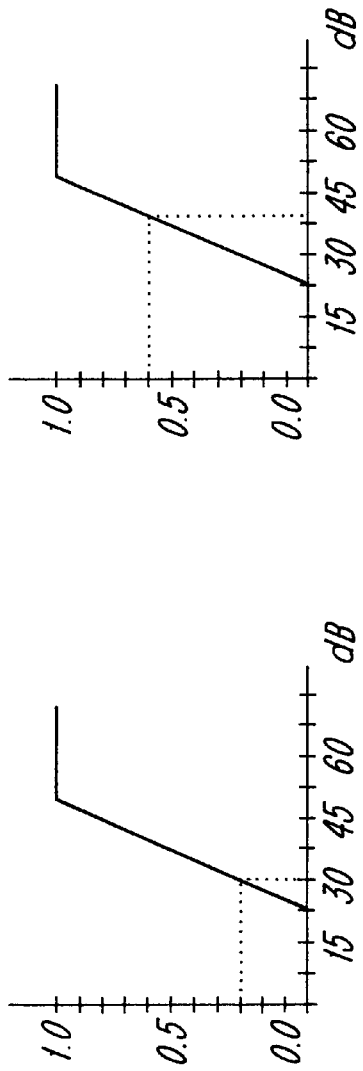
Figure 3D:
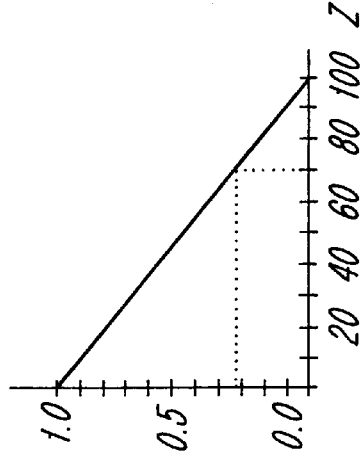
Figure 3E:
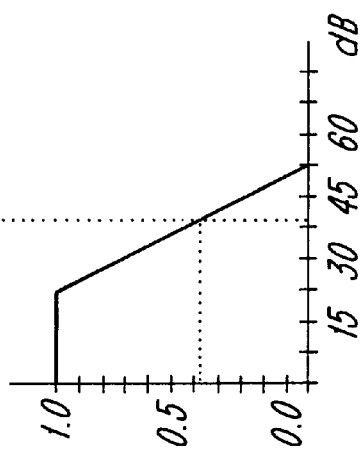
Figure 3F:
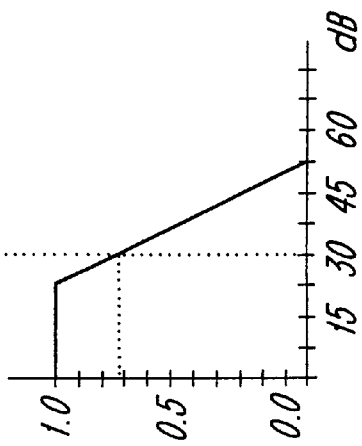

An exemplifying embodiment of an apparatus for processing parameter values to provide basic data on which a handoff decision is made, and for making a handoff decision is illustrated in FIG. 2. The illustrated apparatus includes "fuzzy"-logic hardware. Average values are formed from all system input variables over a given time period, e.g. 480 ms in the case of the GSM-system, and the input variables are equalized by filters, FIR-filter 1, and sent further to a common data buffer 2 or to several data buffers, in the illustrated case LIFO-buffers 2 (Last In First Out). The input data to the "fuzzy"-logic processing unit 3 is divided into the aforesaid groups, where variables and parameters can be placed in more than one group. For later evaluation, the groups may also be allotted different priorities, i.e. a special group or special groups may be considered more important in obtaining the best handoff evaluation. The "fuzzy"-logic processing unit 3 is either totally hardware, a combination (hybrid) of hardware and software, or is constructed of solely software. Suitable hardware for the manufacture of the unit is commercially available from a number of companies, such as OMRON, TOGAI INFRA LOGIC CORP., SIEMENS, etc. Whether or not each group shall have its own rulebase or whether the groups shall share a central rulebase is a matter of choice.

It should be observed that the table (tables) may be implemented either through the medium of software or through the medium of hardware. The rule tables are implemented in the form of IF and THEN conditions, where the conditions IF and THEN are coupled to operators from the max-min-model. The THEN-expression can also be evaluated in accordance with the max-min-model, when the THEN-expression contains more output date functions. The "firing"-values of the THEN-expressions influence the output data-membership functions according to the rules for one of the evaluating methods . Subsequent to having gone through all rules, preferably sequentially, the consequences of all rules are evaluated in the manner described below, which is a chosen method of evaluation:

a. "Max-Height" indicates that the maximum values of the consequences form the "crisp"-value.

b. "Average" indicates performing an average value of the consequences, as will be evident from a following example.

c. The "centroid"-method, which is based on weighting of centroids for boundary surfaces between membership sets. Weighting results in a "crisp"-value ("defuzzy"-value) .

The "crisp"-value or values is/are then sent to the A/C/M/M-unit, in which the average-, complement-, maximum and minimum "crisp"-values are obtained. No average value is obtained when the "fuzzy"-processing unit 3 is comprised of solely one group, and the A/C/M/M-unit 4 then delivers only one output value, namely the single "crisp"-value and its complement, alternatively, also the maximum, minimum and average value of the consequence value or the "firing"-values. As before indicated, all input data, "firing"-values and consequence values are available if required.

The values received from the A/C/M/M-unit are, in turn, sent to the HED-unit 5 for reaching a partial handoff decision or a definite handoff decision. The HED-unit 5 communicates in duplex or full-duplex with a BSC and/or an MSC, from which the unit may receive supplementary information concerning candidate lists, variables, parameters, etc. The HED-unit may also deliver information to BSC/MSC.

Furthermore, the decisions made in A/C/M/M 4 and HED 5 may be reached totally or partially by "fuzzy"-logic. According to one embodiment of the invention, the candidate list is available in HED 5, said list containing fields or records with ranking of own BS (serving cell) and neighbour base cells. The list may contain more information than in the present case; for instance, it would be beneficial if the list also contained an approximate estimate of the number of free speech channels in the fields or records. Alternatively, the candidate list may contain the same information as in present systems.

The "fuzzy"-hardware is controlled via one or more processors, e.g. microprocessors and then preferably "fuzzy"-processors manufactured by the aforementioned companies. The units 1, 2, 3, 4 and 5 are controlled by a control unit 6, optionally via a bus structure. The hardware may be comprised of a control unit 6, an application memory for sequential user instructions and "fuzzy"-decision instructions. Reference is made to EP-A 2,424,890 for a description of the known prior art in this regard. The control unit 6 controls the LIFO-buffers 2, the "fuzzy"-processing unit 3 and its memories, the A/C/M/M-unit 4, the HED-unit 5 and its communication with the rest of the world. This communication may also be controlled from the switch unit. Data communication follows those principles which are well known to the person skilled in this particular art.

The hardware units are installed in or adjacent to MS, BTS (Base Station System), BSC or MSC. The units may be separate hardware units or there may be one or more ASICS, e.g. one ASIC for units 3, 4, 5 and 6. Such ASICS are commercially available. When the hardware for implementing fuzzy-logic according to the invention is installed in or adjacent to BTS, BSC or MSC, the hardware unit may serve all mobile stations MS which are connected to one and the same cell site. The hardware unit may also serve all mobile stations in which signalling is controlled by one and the same BSC, or units physically located in the fixed part of the communication system may be operationally assigned to individual mobile stations or calls, according to system design. That the hardware unit may also be physically placed in MS is supported by the fact that GSM introduces MAHO (Mobile Assisted Handoff).

A first embodiment of an inventive method will now be described in more detail. According to this embodiment, there are used two input data variables RXLEV_UL and RXLEV_NCELL(1), each of which is defined by its membership to two sets, namely RXLEV_UL high measurement grade, RXLEV_UL low measurement grades RXLEV_NCELL(1) high measurement grade and RXLEV_NCELL (1) low measurement grade, each being an assigned membership function whose values extend between 0.0 and 1.0 and define the grade of membership and the measurement values with regard to a defined set. The output data function has also been assigned two sets with their membership functions, namely a high grade membership to NCELL(n) and a low grade membership to NCELL(n). Shown between the rows of diagrams in FIG. 3 are the instantaneous input data variables RXLEV_UL and RXLEV_NCELL(1) 1 for neighbour cell No. 1. Naturally, it is also possible to normalize input data and the values on the abscissa (X-axis), in this case with 63 dB, which is the relative value of maximum signal strength in the illustrated case. In the illustrated example, input data is obtained from mobile station M6

(FIG. 1) and the mobile is connected to the serving (own) base station B1. The input data variable RXLEV_NCELL (1) derives from the neighbour base B6, while the RXLEV_UL measurement values derive from M6. For the sake of simplicity, only two rules are analyzed in the illustrated case, although this analysis is quite sufficient to provide an understanding of the method of procedure.

R1: IF RXLEV_UL has a large measurement value AND RXLEV_NCELL(n) has a small measurement value THEN low grade membership to NCELL(n).

R2: IF RXLEV_UL has a small measurement value AND RXLEV_NCELL(n) has a large measurement value THEN high grade membership to NCELL(n).

In order to facilitate an understanding of the following example, a number of clarifications have been given below. The grade of membership for RXLEV_UL=u, instantaneous value is referenced A(u), and correspondingly the membership grade for RXLEV_NCELL(n)=v is B(v). The membership grades A(u) and B(v) are obtained by the instantaneous values, whose domains are found on the X-axis in FIGS. 3(a, b, c, d, e) pointing to the membership grade on the Y-axis. The grades or values, thus obtained form antecedents in the rules which are compared with the min-operator (AND). The thus min-value obtained implicates, via the THEN expression, a specific membership function (evaluation function) in Figures c, f of the FIG. 3 illustration, by pointing out, via the Y-axis, with the minimum value an X-axis value according to one of the evaluation functions, which is referred to as the rule consequence and here designated Z(A(u)) or Z(B(v)). Subsequent to having gone through all rules sequentially to obtain a list of instantaneous values, all Z( ) values are weighted. In example according to the average value method, a "crisp"-value is obtained (a "defuzzy"-value) as a result. A candidate list according to FIGS. 4(a, b) is then updated with the "crisp"-value.

The following takes place according to the max-min-model, with reference to FIGS. 3(a, b, c, d, e, f):

Given instantaneous input data values for RXLEV_UL= u=30 dB, and RXLEV_NCELL(1)=v=38. The linguistic expression for rule 1 states that u=30 dB obtains its membership grade A(30)=0.31 to the set RXLEV_UL large measurement value from FIG. 3a (dotted line). Rule 1 also states, that v=38 dB obtains its membership grade B(38)= 0.41 to the set RXLEV_NCELL(1) small measurement value from FIG. 3e (dotted line). The memberships A(30) and B(38) are then compared according to the IF expression in rule 1, the conditional statement with the minimum operator AND, with the result that A(30)=0.31 is chosen. The THEN expression is then taken, which according to rule 1 states that the mini-value A(30)=0.31 shall implicate the output data set low membership to NCELL(1) , FIG. 3f. The X-value corresponding to A(30)=0.31 is then read off from the Y-axis in FIG. 3f, this X-value being referenced Z(A (30)=0.31)=70 and forming the consequence value for rule 1. In the next step, rule 2 is executed in the same way as rule 1. According to the linguistic expression for rule 2, the membership A(30)=0.70 is obtained from FIG. 3d and the membership B(38)=0.65 is obtained from FIG. 3b. When comparing A(30)=0.70 and B(38)=0.65 with the min-operator AND in rule 2, B(38)=0.65 shall, according to the THEN expression in rule 2, implicate the output data set a high membership grade to NCELL(1) in FIG. 3c. An X-value corresponding to B(38)=0.65 is read from the Y-axis in FIG. 3c, this X-value being referenced Z(B(38)= 0.65)=65 and forms the rule-2 consequence value. Consequently, the rule table including the rules R1 and R2 has been gone through sequentially and the consequences of said rules have been evaluated by the average value method according to the following.

A brief summary of the above description will now be given in rule form.

R1: IF A(30)=0.31 AND B(38)=0.41 THEN Z(A(30)= 0.31)=70

R2: IF A(30)=0.70 AND B(38)=0.65 THEN Z(3(38)= 0.65)=65

The average value method states that the consequence values in the example shall be weighted in accordance with the following, in order to obtain a "crisp"-value ("defuzzy"-value).

$C_{risp}$=(membership of NCELL(1))=(A(30)*Z(A(30))+B (38)*Z(B(38))) /(A(30)+B(38))=((0.31) (70)+(0.65) (65))/ (0.31+0.65)≈67 within a range from 0 to 100, i.e. the mobile station should belong to NCELL(1) with the unit 67 and present serving cell with the unit 100-67=33.

The aforedescribed method is repeated cyclically with comparisons between, for instance, 6 neighbour cells and serving cell for the mobile M6.

The parameter RXLEV_UL belongs to serving cell B1 (own cell) and the mobile M6. The parameter RXLEV_NCELL(1) belongs to the neighbour cell 1 (B6 in FIG. 1). FIGS. 4a and 4b illustrate updating of a candidate list with the aid of the obtained "crisp"-value 67 and 33. The list is based on the cell pattern illustrated in FIG. 1.

Prior to updating, the candidate list has the appearance shown in FIG. 4a, with the neighbour cell 1 (B6) highest in the hierarchy and the serving cell B1 on the third level in the list. The candidate list is now updated with the "crisp"-value 67 and 33, according to FIG. 4b. Since the neighbour cell 1 (B6) is the best cell, the serving cell B1 will obtain its worst complement and must be updated with the complement in the candidate list (FIG. 4b). The neighbour cells are always updated with their new values. It will be observed that the candidate lists in FIGS. 4 (a, b) belong to the mobile M6. In the case of this example, a minimum threshold value of 35 has been chosen as indicative of when the mobile M6 should be permitted to make a handoff. In other words, when the serving cell complement value is equal to or less than 35, a decision should be made to handoff to one of the neighbour cells B6 or B7, for instance. The example (gave the complementary "crisp"-value 33 for the serving cell, and consequently a handoff decision will be effected in accordance with the candidate list shown in FIG. 4b.

It should be mentioned that the choice of adequate membership functions is an optional choice, and need not therefore be linear. However, linear functions are often very suitable and can also be stored readily in the memory, i.e. all functions which are triangular or trapezoidal can be stored in the memory as three points with their vertexes as coordinates. Reference is made in this regard to EP-A 2,424,890. This leads to simple calculations of the points at which the variables intersect a line according to the linear equation. The position of the origin is implicit in the case of trapezoidal functions.

The following procedure is followed when using the centroid method for evaluating to obtain the "crisp"-value. The rule output data implicates the output data function, so as to move the vertex to the rule output data value (the "firing"-value) and the overlapping set section surfaces S1, S2, . . . , SN and their centroids G1, G2, . . . , GN are weighted according to $C_{risp}$=(S1*G1+S2*G2+. . . +SN-1*GN-1+SN*GN)/(S1+S2+. . . +SN-1+SN). The reader is referred to publication EP-A 2,424,890 for further information.

According to the aforegoing, the variable RXLEV_NCELL(n) should always be an input variable to at least one group in the case of intercell-handoff. It is also an advantage for the variable RXLEV_UL to belong to at least one of the RXLEV_NCELL(n) groups. Assume that RXLEV_UL also forms groups with. RXQUAL_UL and that the "crisp"-values from said groups are sent to the A/C/M/M-unit 4. When the group which contains RXQUAL_UL gives the maximum "crisp"-value, it is assumed that the signal quality is probably better in the serving (own) cell than in the specific neighbour cell NCELL(X). When the group to which RXLEV_NCELL(X) belongs gives the best "crisp"-value and the "crisp"-value of the second group is equal to or less than a minimum threshold value, it is necessary to effect handoff in accordance with the candidate list. The candidate list should be at least updated with the value from at least one group to which RXLEV_NCELL(N) belongs. The "crisp"-values of several groups may also be used to update the candidate list.

A second embodiment of a method according to the invention will now be described in brief. In this embodiment, the "fuzzy" part of the system is the same as that used in the first embodiment. The main difference between the first and the second embodiments is that in the case of the second embodiment, variables and parameters are duplicated, triplicated, etc., i.e. the same variable serves as input data in duplicate, triplicate, etc., to one variable-parameter group. One or more of these input data variables or input data parameters will then carry the latest obtained value and the other, others, or a suitable preceding value, for instance the nearest preceding value or still earlier values. This procedure requires the preceding, relevant value or values to be saved (stored). The method involves supplying at least two input data variables or input data parameters to each group, although these variables or parameters may be the same variable (duplicated, triplicated, etc.) with the values time displaced. The method according to the second embodiment is the same as the method according to the first embodiment in all other respects, except with small modifications.

A third embodiment of an inventive method will now be described. So that this embodiment will be understood more readily by those who are not skilled in this particular art, some general considerations which underly the selection of parameters and the design of output functions, fuzzy rules and consequences will be described. Also described are the results obtained from simulations and comparisons made with a system performance simulator (SPS) in which fuzzy logic is not used.

SPS stands for System Performance Simulator, and works at system level. It has been developed at Ericsson Radio Systems AB, S/DT, from the end of 1989. The systems possible to simulate are CMS88 digital, CMS88 analogue and CME20. In our simulation a 4/12 cell pattern is used and a total of 90 cells exist. 1000 MS, mobile stations, move according to tracks generated by a track generator. The MS's initiate calls to simulate a cellular mobile system environment.

Creation of membership functions will first be discussed. To use fuzzy logic we have to classify the different inputs by their membership functions.

In this embodiment the most relevant parameters, to get equivalent results as the SPS, are:
Signal strength on downlink for own cell, named SSE
Signal strength on downlink for neighbour cell, named SSN
Bit-Error-Rate on down-/uplink for own cell, named BER SSE, SSN The SPS measures the signal strength for own cell and for all reachable neighbour cells. The domain for SSE and SSN is −48 dBm to −110 dBm. −48 dBm is very good signal strength and −110 dBm is regarded as very bad signal strength. If the measured value is out of range it will be set to the nearest limit.

To be able to create membership functions one has to know which signal strength is regarded as considerably good, considerably bad, etc.

By studying several simulations, made by the SPS, one gets a good opinion of how the signal strength varies, when handover is initiated, when the call soon will be lost, etc. Briefly described;

In the near region of the radio base station, SSE is often very good, approximately better than −60 dBm.

When the distance increases SSE decreases, and finally SSE is so bad that the call is lost.

The communication is acceptable down to −85 dBm approximately.

Handover is mostly initiated in the [−70 dBm, −85 dBm] interval.

If signal strength reaches below −100 dBm the communication becomes intolerable.

It was decided to create two membership functions for the fuzzy set "signal strength", called "good signal strength" and "bad signal strength". The domain is, as mentioned [−48 dBm, −110 dBm].

It is desirable to overestimate own cell relative to the neighbour cells. This is to avoid the "ping-pong effect", i.e. prevent from an immediate handover back to the previous cell. That is the purpose for not having exactly the same membership functions for SSE and SSN. For instance, if SSE and SSN has the same value, then SSE must be regarded as more "good" than SSN. This may be compared with the hysteresis in the locating algorithm.

Figure 5A:
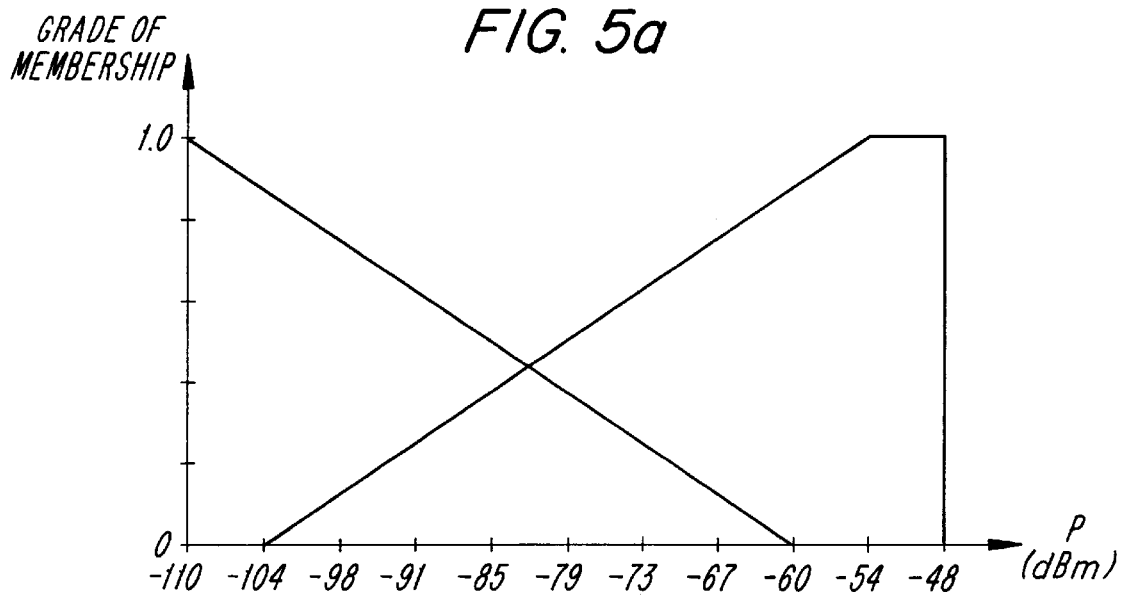
FIGS. 5a and 5b illustrates membership functions for SSE and SSN respectively.
Figure 5B:
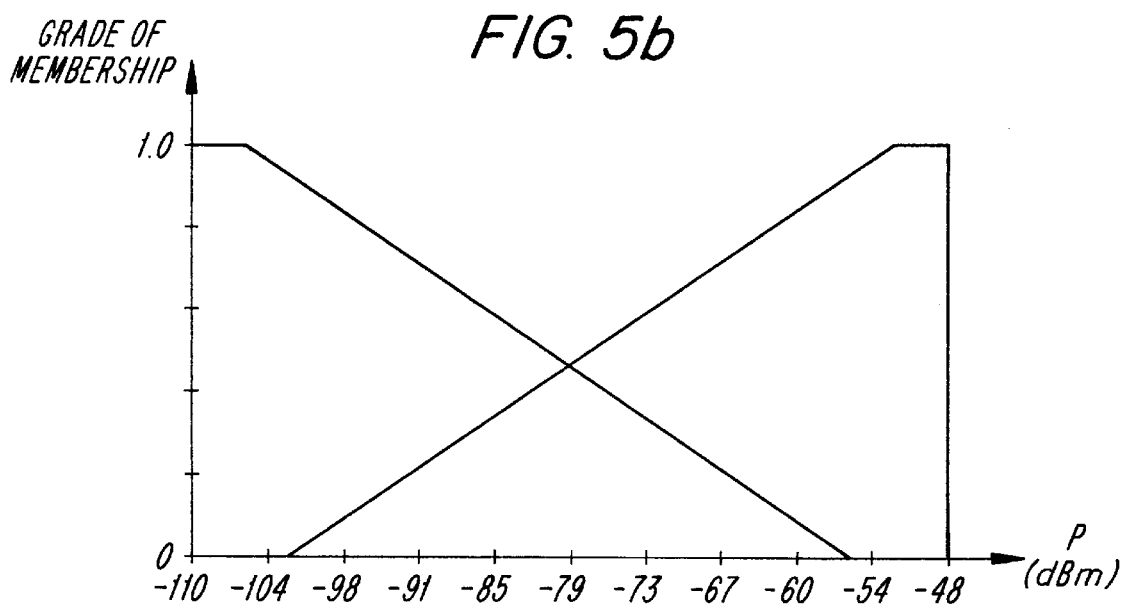

From these experiences, and after several simulations and adjustments the membership functions for SSE and SSN were decided to look like FIGS. 5a and 5B respectively.

Bit-Error-Rate, measured only for own cell, gives a value for the quality of the call. In the SPS BER varies in the [0.70] interval. These values refer to the estimated error probabilities, in the received bitstream, before channel decoding, as follows:

```
0  => less than 0.2%
10 => 0.2% to 0.4%
20 => 0.4% to 0.8%
30 => 0.8% to 1.6%
40 => 1.6% to 3.2%
50 => 3.2% to 6.4%
60 => 6.4% to 12.8%
70 => greater than 12.8%
```

If the measured value is out of range it will be set to the nearest limit.

In the SPS, which uses the locating algorithm, BER is used only to initiate so called alarm handover, when the quality becomes too bad. This limit is set to 58, and at this level handover is initiated to a cell with probably worse signal strength. When BER is better than 58 (<58) the handover decision is made with no concern of BER. However, this parameter is of interest even when its value is not at the alarm limit. In the SPS handover is sometimes initiated right in the middle of a cell area. This happens when SSE goes down for a short moment and a neighbour cell reaches the top of the candidate list. This might occur because of a short fading dip. This happens in spite of the fact that BER often is quite good, i.e. the quality is good enough to maintain the communication.

According to this embodiment three membership functions for the fuzzy set BER were created, called "bad quality", "ok quality" and "good quality". The domain is (0.70).

Bad quality—BER is so high that the communication is intolerable, approximately worse than 58 (>58).

Ok quality—BER is ok, but that is all. If there is a better neighbour cell a handover will be initiated directly, approximately 40–58.

Figure 6:
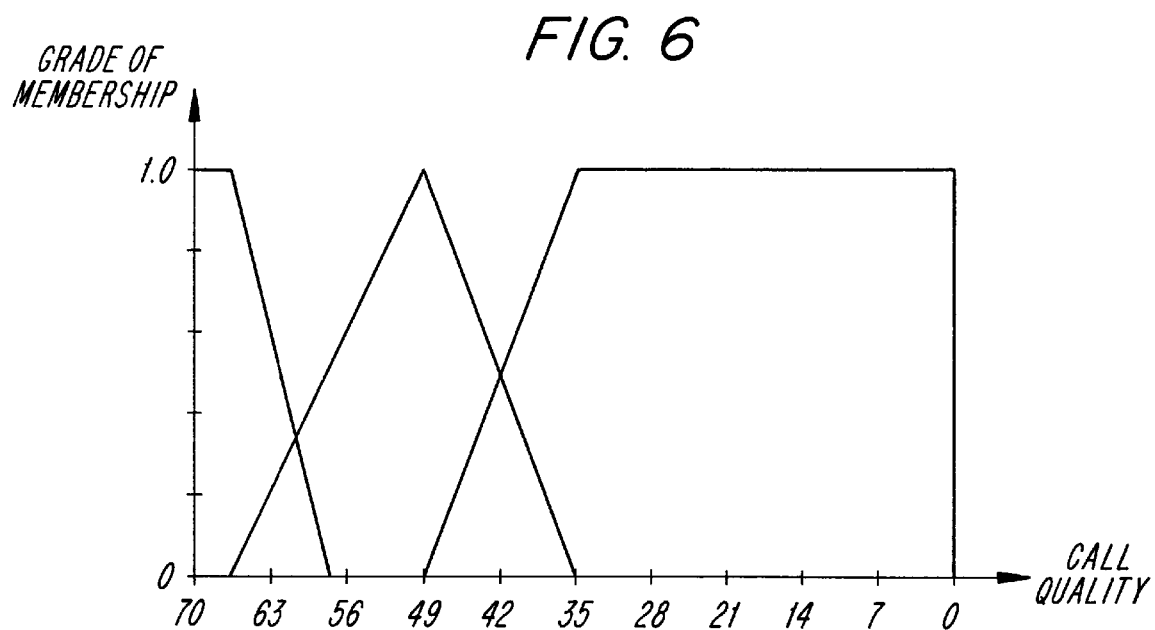
FIG. 6 illustrates membership functions for BER.

Good quality—BER is low, and the quality is good enough to keep the communication, even if SSE falls for a short time. This, and several simulations and adjustments, lead to membership functions like FIG. 6.

Creation of fuzzy logic rules for handover will now be desribed. The chosen inputs, for which membership functions are created, are SSE, SSN and BER.

When developing the fuzzy logic rules for the chosen inputs it was decided to make a comparison between all inputs at a time. Meaning that three inputs lead to one consequence.

The consequence was defined as "grade of membership to handover". In every fuzzy logic evaluation a comparison is made between SSE, BER and SSNx, where x is the number of a specific neighbour cell. The consequence then will be "how much do we want to initiate a handover to this particular neighbour cell", in percent. At every cycle the own cell is compared with all reachable neighbour cells, one at a time.

The rules used for specifying the behaviour of the fuzzy logic system were written as below. Referring to the inputs' different membership functions:

| IF | $BER_{bad}$  | AND | $SSE_{bad}$  | AND | $SSN_{bad}$  | THEN ... |
|----|--------------|-----|--------------|-----|--------------|----------|
| IF | $BER_{bad}$  | AND | $SSE_{bad}$  | AND | $SSN_{good}$ | THEN ... |
| IF | $BER_{bad}$  | AND | $SSE_{good}$ | AND | $SSN_{bad}$  | THEN ... |
| IF | $BER_{bad}$  | AND | $SSE_{good}$ | AND | $SSN_{good}$ | THEN ... |
| IF | $BER_{ok}$   | AND | $SSE_{bad}$  | AND | $SSN_{bad}$  | THEN ... |
| IF | $BER_{ok}$   | AND | $SSE_{bad}$  | AND | $SSN_{good}$ | THEN ... |
| IF | $BER_{ok}$   | AND | $SSE_{good}$ | AND | $SSN_{bad}$  | THEN ... |
| IF | $BER_{ok}$   | AND | $SSE_{good}$ | AND | $SSN_{good}$ | THEN ... |
| IF | $BER_{good}$ | AND | $SSE_{bad}$  | AND | $SSN_{bad}$  | THEN ... |
| IF | $BER_{good}$ | AND | $SSE_{bad}$  | AND | $SSN_{good}$ | THEN ... |
| IF | $BER_{good}$ | AND | $SSE_{good}$ | AND | $SSN_{bad}$  | THEN ... |
| IF | $BER_{good}$ | AND | $SSE_{good}$ | AND | $SSN_{good}$ | THEN ... |

BER corresponds to the worst Bit-Error-Rate, up- or downlink. $BER_{index}$ is the grade of membership to this particular membership function. SSE stands for signal strength on downlink for own cell. SSN stands for signal strength on downlink for neighbour cell.

To find out which consequences the rules will lead to we have been discussing every rules outcome, in terms of linguistic expressions.

The output "grade of membership to handover" is divided into three possible outcomes, i.e. output functions. They are; "low grade of membership", "decent grade of membership" and "high grade of membership". In a more popular expression; "do not abandon own cell", "you can possibly change to another cell" and "abandon own cell immediately".

The discussion, in linguistic terms, can be summarized as:

On the assumption that BER is bad, handover has "high grade of membership", irrespective of the value of SSE. The only exception might be when SSN is very bad and SSE is very good. This exception leads to no direct handover initiation when BER get close to the alarm limit, provided that all neighbour cells are extremely bad.

On the assumption that BER is ok, the signal strength should be of most importance. Under these circumstances the mobile is probably situated quite a distance away from the radio base station antenna. If a better neighbour cell is found a handover should be initiated to that particular cell. This means; If SSE is better than SSN handover has "low grade of membership", and vice versa leads to "high grade of membership". If they are equivalent the grade is "decent".

On the assumption that BER is good, no handover is initiated if SSN is bad, irrespective of the value of SSE. For instance, this scenario will appear when the mobile drives through a short fading dip, in the middle of a cell. However, if SSE and SSN are equivalent good, or if SSN is even better, a handover might be initiated to that particular cell. The last occurrence, with two cells having very good signal strength, might occur often in this type of cell cluster. This is because we have sector cells, where one base station serves three surrounding cells using directional antennas. The mobile might be driving on the border between two cells of the same bass station, and therefore also be close to both antennas at the same time.

After several simulations and adjustments this discussion was implemented in the following rules and consequences:

| IF | $BER_{bad}$  | AND | $SSE_{bad}$  | AND | $SSN_{bad}$  | THEN | $HANDOVER_{high}$   |
|----|--------------|-----|--------------|-----|--------------|------|---------------------|
| IF | $BER_{bad}$  | AND | $SSE_{good}$ | AND | $SSN_{bad}$  | THEN | $HANDOVER_{decent}$ |
| IF | $BER_{bad}$  | AND | $SSE_{bad}$  | AND | $SSN_{good}$ | THEN | $HANDOVER_{high}$   |
| IF | $BER_{bad}$  | AND | $SSE_{good}$ | AND | $SSN_{good}$ | THEN | $HANDOVER_{high}$   |
| IF | $BER_{ok}$   | AND | $SSE_{bad}$  | AND | $SSN_{bad}$  | THEN | $HANDOVER_{decent}$ |
| IF | $BER_{ok}$   | AND | $SSE_{good}$ | AND | $SSN_{bad}$  | THEN | $HANDOVER_{low}$    |
| IF | $BER_{ok}$   | AND | $SSE_{bad}$  | AND | $SSN_{good}$ | THEN | $HANDOVER_{high}$   |
| IF | $BER_{ok}$   | AND | $SSE_{good}$ | AND | $SSN_{good}$ | THEN | $HANDOVER_{decent}$ |
| IF | $BER_{good}$ | AND | $SSE_{bad}$  | AND | $SSN_{bad}$  | THEN | $HANDOVER_{low}$    |
| IF | $BER_{good}$ | AND | $SSE_{good}$ | AND | $SSN_{bad}$  | THEN | $HANDOVER_{low}$    |
| IF | $BER_{good}$ | AND | $SSE_{bad}$  | AND | $SSN_{good}$ | THEN | $HANDOVER_{high}$   |
| IF | $BER_{good}$ | AND | $SSE_{good}$ | AND | $SSN_{good}$ | THEN | $HANDOVER_{decent}$ |

To evaluate the result and find a single total output, crisp value the Centre-Of-Gravity method (COG) is chosen.

As mentioned, the consequence "handover" is divided into three output functions. These are formed as triangles, with their centre of gravities as illusttrated in FIG. 7. The results are spread in the [0%, 100%] interval. The centre of gravity for "decent membership to handover" is at 50%. The limit for handover is also set to 50%.

In this COG-method all outputs will be taken into consideration. The values of the output consequences set the heights of their corresponding output functions. An example is illustrated in FIG. 8 where outputs from rule 2, 5 and 7 are non-zero.

2: 0.7 (effects output "decent")
5: 0.9 (effects output "decent")
7: 0.2 (effects output "high")

The areas and centre of gravities are consolidated by the described method. The total centre of gravity is our crisp value.

Figure 9:
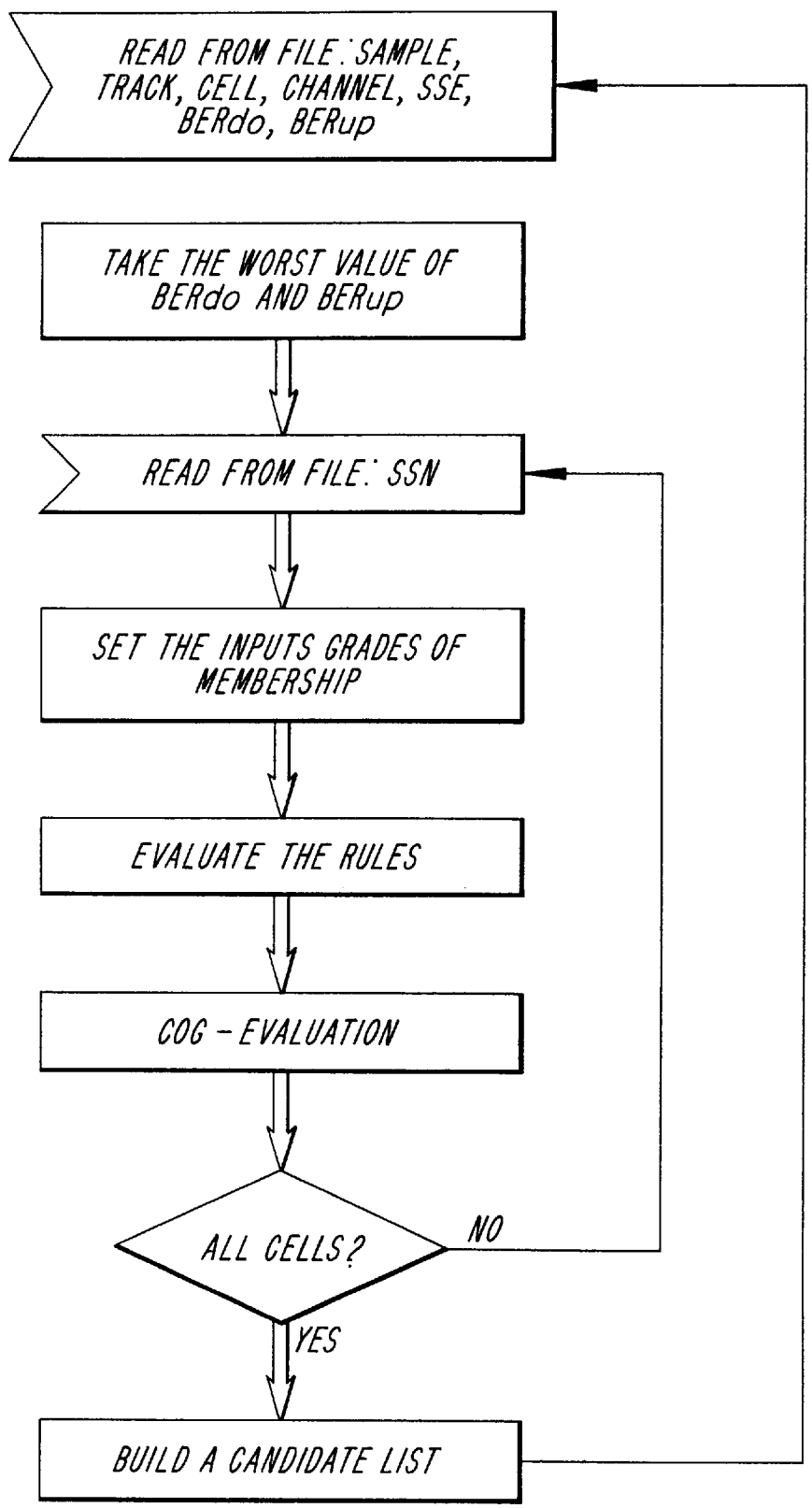
FIG. 9 illustrates a flow chart of a "fuzzy"-logic implementation.

An overview of the fuzzy logic implementation with the general functions and decisions are illustrated by the flow-chart of FIG. 9.

The events of a specific MS following a track in the SPS simulator and the results of the simulated system without fuzzy-logic will now be analyzed.

handover. The reason for this might be that there exist no neighbour cell with the potential of delivering better communication possibilities.

Now the specific file, that is created by the modified SPS program will be analyzed. Short comments are made in order to explain the different events.

The following was logged:
TRACK: the number of the followed track
CELL: the cell number
CHAN: the channel number
X-/Y-pos: the mobile's position in the cell cluster
SAMPLE: The simulation time, real time between samples is 480 ms
BER: Bit-Error-Rate on up- or downlink
SSE: signal strength for own cell
SSN: signal strength for the different neighbour cells For the presentation of data the indicated formats and columns will be used. Every second line refers to a track and every second line refers to a sample.

| TRACK | CELL | CHAN | | X-pos | | Y-pos | | |
|---|---|---|---|---|---|---|---|---|
| SAMPLE | | BERu | BERd | SSE | SSN1 | SSN2 | SSN3 | SSN4 | SSN5 |
| 352 | 23C | | | 16 | −12.09 | | 11.56 | | |
| 223 | | 18 | 50 | −84 | −110 | −110 | −152 | −142 | −151 |
| 352 | 23C | | | 16 | −12.09 | | 11.55 | | |
| 224 | | 18 | 50 | −84 | −110 | −110 | −152 | −143 | −152 |
| 352 | 23C | | | 16 | −12.08 | | 11.55 | | |
| 225 | | 15 | 45 | −84 | −110 | −110 | −89 | −79 | −89 23C −> 24A |
| 352 | 24A | | | 85 | −12.07 | | 11.51 | | |
| 231 | | 3 | 5 | −71 | −82 | −56 | −90 | −85 | −89 |
| 352 | 24A | | | 85 | −12.07 | | 11.50 | | |
| 232 | | 0 | 3 | −71 | −82 | −57 | −90 | −85 | −90 |
| 352 | 24A | | | 85 | −12.07 | | 11.49 | | |
| 233 | | 0 | 0 | −70 | −81 | −56 | −90 | −85 | −91 |

The call was originally set up at sample 20 and the MS follows track No. 352. For the reason of space, parts of the track where nothing of interest happens will be excluded.

At the beginning of the simulation a few handovers are made due to bad quality. Later an alarm condition arose at sample 164 and it prevailed for quite some time. Finally the quality improved and at sample 222 there is no longer an alarm condition.

Sometimes handover is not possible to perform. There is a variety of reasons for this. Congestion is one of them. It is caused by a heavy traffic load and this is what causes the delayed handover at sample 241 (see below). Even when quality alarm is activated this might not lead to an immediate At sample 225 a few better neighbour cells are scanned and their signal strengths are measured. One neighbour cell, cell N4, has got such a good signal strength that handover is immediately made to this cell. At sample 231 measurement values for the new neighbour cells are being delivered. Since a handover to cell N4 was performed this is the cell that appears as the measured own cell at sample 231.

| 352 | 24A | | | 85 | −12.05 | | 11.45 | | |
|---|---|---|---|---|---|---|---|---|---|
| 240 | | 3 | 3 | −74 | −85 | −60 | −92 | −87 | −92 |
| 352 | 24A | | | 85 | −12.05 | | 11.44 | | |
| 241 | | 3 | 5 | −75 | −86 | −61 | −92 | −87 | −92 24A −> 24C |
| 352 | 24C | | | 121 | −12.04 | | 11.40 | | |
| 247 | | 0 | 0 | −61 | −77 | −87 | −94 | −87 | −92 |
| 352 | 24C | | | 121 | −12.03 | | 11.39 | | |
| 248 | | 0 | 0 | −62 | −78 | −88 | −94 | −87 | −92 |
| 352 | 24C | | | 121 | −12.03 | | 11.38 | | |
| 249 | | 0 | 0 | −61 | −78 | −88 | −93 | −87 | −92 |
| 352 | 24C | | | 121 | −12.03 | | 11.38 | | |
| 250 | | 0 | 5 | −62 | −78 | −89 | −93 | −87 | −92 |

At sample 231 when handover had just been made, an even better neighbour cell is found, cell N2, and handover is immediately initiated to this cell, but because of congestion in the system this handover is not possible to perform. At sample 241 the handover is finally possible. At sample 247 cell N2 appears as the new own cell.

| | | | | | | | | | | | |
|---|---|---|---|---|---|---|---|---|---|---|---|
| 352 | 24C | | | 121 | | −11.78 | | 10.61 | | | |
| 360 | | 0 | 0 | | −50 | −47 | −65 | −92 | | −87 | −92 |
| 352 | 24C | | | 121 | | −11.78 | | 10.61 | | | |
| 361 | | 0 | 0 | | −51 | −47 | −65 | −92 | | −87 | −92 | 24C −> 24A |
| 352 | 24A | | | 85 | | −11.77 | | 10.57 | | | |
| 367 | | 0 | 0 | | −47 | −69 | −56 | −92 | | −92 | −84 |
| 352 | 24A | | | 85 | | −11.76 | | 10.56 | | | |
| 368 | | 0 | 0 | | −47 | −69 | −56 | −92 | | −92 | −84 |

At sample 361 a normal handover to neighbour cell N1 is made. By normal we mean handover due to better signal strength. Signal strength for this cell is found to be better than own cell to a certain degree (hysteresis).

Four handovers are made here because of quality alarm. First at sample 584 to cell N5, then at sample 594 to cell N1, then at sample 600 to cell N3 and finally at sample 607 to cell N5.

| | | | | | | | | | | | |
|---|---|---|---|---|---|---|---|---|---|---|---|
| 352 | 24A | | | 85 | | −11.15 | | 9.37 | | | |
| 556 | | 53 | 3 | | −74 | −80 | −93 | −94 | | −99 | −74 |
| 352 | 24A | | | 85 | | −11.15 | | 9.37 | | | |
| 557 | | 55 | 3 | | −74 | −80 | −93 | −95 | | −100 | −74 |
| 352 | 24A | | | 85 | | −11.15 | | 9.36 | | | |
| 558 | | 58 | 3 | | −75 | −81 | −94 | −96 | | −101 | −74 | 24A −> 23C |
| 352 | 23C | | | 11 | | −11.13 | | 9.33 | | | |
| 564 | | 0 | 25 | | −76 | −104 | −104 | −97 | | −84 | −83 |
| 352 | 23C | | | 11 | | −11.12 | | 9.32 | | | |
| 565 | | 0 | 28 | | −77 | −105 | −105 | −96 | | −84 | −83 |
| 352 | 23C | | | 11 | | −11.12 | | 9.31 | | | |
| 566 | | 0 | 33 | | −76 | −105 | −105 | −95 | | −83 | −82 |

Here the quality on downlink has deteriorated to the degree where handover is necessary. This is made at sample 558 to neighbour cell N5 because of quality alarm.

| | | | | | | | | | | | |
|---|---|---|---|---|---|---|---|---|---|---|---|
| 352 | 23C | | | 11 | | −11.07 | | 9.21 | | | |
| 583 | | 20 | 55 | | −82 | −109 | −109 | −96 | | −91 | −88 |
| 352 | 23C | | | 11 | | −11.06 | | 9.20 | | | |
| 584 | | 23 | 58 | | −83 | −110 | −110 | −95 | | −89 | −86 | 23C −> 24B |
| 352 | 24B | | | 48 | | −11.04 | | 9.17 | | | |
| 590 | | 33 | 53 | | −81 | −79 | −96 | −96 | | −110 | −104 |
| 352 | 24B | | | 48 | | −11.04 | | 9.16 | | | |
| 591 | | 35 | 53 | | −81 | −79 | −96 | −95 | | −110 | −104 |
| 352 | 24B | | | 48 | | −11.04 | | 9.16 | | | |
| 592 | | 38 | 53 | | −81 | −79 | −96 | −94 | | −110 | −104 |
| 352 | 24B | | | 48 | | −11.03 | | 9.15 | | | |
| 593 | | 40 | 55 | | −81 | −79 | −97 | −94 | | −110 | −104 |
| 352 | 24B | | | 48 | | −11.03 | | 9.14 | | | |
| 594 | | 40 | 58 | | −82 | −80 | −97 | −94 | | −110 | −104 | 24B −> 24A |
| 352 | 24A | | | 88 | | −11.01 | | 9.11 | | | |
| 600 | | 58 | 23 | | −81 | −91 | −99 | −79 | | −86 | −85 | 24A −> 21B |
| 352 | 21B | | | 114 | | −10.99 | | 9.07 | | | |
| 606 | | 55 | 43 | | −85 | −106 | −93 | −88 | | −104 | −86 |
| 352 | 21B | | | 114 | | −10.99 | | 9.07 | | | |
| 607 | | 60 | 50 | | −86 | −107 | −94 | −88 | | −103 | −85 | 21B −>24A |
| 352 | 24A | | | 85 | | −10.97 | | 9.03 | | | |
| 613 | | 28 | 10 | | −80 | −90 | −98 | −101 | | −102 | −87 |
| 352 | 24A | | | 85 | | −10.97 | | 9.02 | | | |
| 614 | | 28 | 10 | | −80 | −90 | −98 | −101 | | −102 | −87 |

| | | | | | | | | | | | |
|---|---|---|---|---|---|---|---|---|---|---|---|
| 352 | 24A | | | 85 | | −10.89 | | 8.88 | | | |
| 638 | | 53 | 8 | | −79 | −83 | −97 | −91 | | −98 | −88 |
| 352 | 24A | | | 85 | | −10.89 | | 8.87 | | | |
| 639 | | 58 | 10 | | −80 | −84 | −98 | −90 | | −97 | −88 | 24A −> 24B |
| 352 | 24B | | | 46 | | −10.87 | | 8.83 | | | |
| 645 | | 43 | 40 | | −83 | −91 | −98 | −91 | | −99 | −100 |

-continued

| | | | | | | | | | | | |
|---|---|---|---|---|---|---|---|---|---|---|---|
| 352 | 24B | | | 46 | | -10.87 | | | 8.83 | | |
| 646 | | 38 | 33 | | -81 | -89 | -96 | -91 | | -99 | -100 |
| 352 | 24B | | | 46 | | -10.87 | | | 8.82 | | |
| 647 | | 33 | 25 | | -79 | -87 | -94 | -90 | | -99 | -100 |

Quality alarm at sample 639 causes a handover to cell N1.

| | | | | | | | | | | | | |
|---|---|---|---|---|---|---|---|---|---|---|---|---|
| 352 | 24B | | | 46 | | -10.63 | | | 8.32 | | | |
| 730 | | 33 | 38 | | -80 | -80 | -95 | -73 | | -99 | -100 | |
| 352 | 24B | | | 46 | | -10.6.3 | | | 8.31 | | | |
| 731 | | 33 | 40 | | -81 | -81 | -96 | -74 | | -99 | -100 | |
| 352 | 24B | | | 46 | | -10.63 | | | 8.30 | | | |
| 732 | | 35 | 43 | | -81 | -81 | -96 | -75 | | -99 | -100 | |
| 352 | 24B | | | 46 | | -10.63 | | | 8.30 | | | |
| 733 | | 40 | 43 | | -81 | -81 | -96 | -75 | | -99 | -100 | |
| 352 | 24B | | | 46 | | -10.62 | | | 8.29 | | | |
| 734 | | 48 | 58 | | -83 | -83 | -98 | -74 | | -99 | -100 | |
| 352 | 24B | | | 46 | | -10.62 | | | 8.29 | | | |
| 735 | | 50 | 63 | | -84 | -84 | -99 | -74 | | -99 | -100 | 24B -> 24A |
| 352 | 24A | | | 85 | | -10.60 | | | 8.25 | | | |
| 741 | | 43 | 23 | | -83 | -91 | -99 | -90 | | -101 | -73 | |
| 352 | 24A | | | 85 | | -10.60 | | | 8.25 | | | |
| 742 | | 40 | 20 | | -83 | -90 | -98 | -91 | | -102 | -73 | |

Quality alarm at sample 734. Because of congestion handover to cell N3 is made at sample 735.

| | | | | | | | | | | | | |
|---|---|---|---|---|---|---|---|---|---|---|---|---|
| 352 | 24A | | | 85 | | -10.58 | | | 8.19 | | | |
| 751 | | 38 | 15 | | -80 | -88 | -96 | -90 | | -102 | -67 | |
| 352 | 24A | | | 85 | | -10.58 | | | 8.19 | | | |
| 752 | | 38 | 15 | | -80 | -88 | -96 | -90 | | -102 | -67 | 24A -> 23C |
| 352 | 23C | | | 17 | | -10.56 | | | 8.15 | | | |
| 758 | | 0 | 5 | | -67 | -96 | -96 | -83 | | -90 | -88 | |
| 352 | 23C | | | 17 | | -10.56 | | | 8.15 | | | |
| 759 | | 0 | 8 | | -67 | -95 | -95 | -84 | | -84 | -88 | |

When the previous quality alarm handover had just been made one neighbour cell with much better signal strength values than own cell was found. A signal strength handover at sample 741 was not possible to perform due to congestion. The situation prevailed until sample 752 where handover to cell No. 5 was made.

It has now been described how a usual call can be followed and how communication with the MS is maintained. The different events that occur during the call are quite normal and are handled according to the rules of the locating algorithm.

A comparison between handovers performed by the SPS simulator and handovers initiated by the fuzzy logic based system, is now done by using the output file from the SPS as input to our system.

The result when using fuzzy-logic in accordance with the present invention is shown as a candidate list, at every sample, for all the cells including own cell. The limit for handover is set to 50%, as mentioned earlier. Hence, every neighbour cell, which gives "membership to handover" >50% will be ranked as better than own cell. The values in the candidate list refer to the particular cell's "grade of membership to handover". The value for own cell is simply set to the complement of the best neighbour cell.

The fuzzy logic system for locating nearly always manage to present the correct candidate list for every sample and in the cases where it does fail it is only a question of one or two samples from perfection. Our system also manage to prevent unmotivated handovers when for instance the neighbour cell has got a slightly better signal strength, but the quality on the own cell is fairly good. A handover attempt just because of a slightly better signal strength might lead to a handback, and will here be performed only when quality is bad, or if both SSE and SSN are very good.

Below follows some interesting parts of the track that the MS followed throughout the landscape, with comments. It is the same MS that was tracked previously. For reasons of space in the tables the same column labelled CRISP is used for both crisp-value and the complement to the crisp-value

| SAMPLE | CANDIDATE CRISP | TRACK | CELL/CHANNEL | X-pos | Y-pos |
|---|---|---|---|---|---|
| 223 | | 352 | 23C/16 | -12.09 | 11.56 |
| | OWN_CELL : 72.7599 | | | | |
| | NCELL_1 : 27.2401 | | | | |
| | NCELL_2 : 27.2401 | | | | |
| | NCELL_3 : 27.2401 | | | | |

-continued

| SAMPLE | CANDIDATE CRISP | TRACK | CELL/CHANNEL | X-pos | Y-pos |
|---|---|---|---|---|---|
|  | NCELL_4 : 27.2401 |  |  |  |  |
|  | NCELL_5 : 27.2401 |  |  |  |  |
| 224 |  | 352 | 23C/16 | −12.09 | 11.55 |
|  | OWN_CELL : 72.7599 |  |  |  |  |
|  | NCELL_1 : 27.2401 |  |  |  |  |
|  | NCELL_2 : 27.2401 |  |  |  |  |
|  | NCELL_3 : 27.2401 |  |  |  |  |
|  | NCELL_4 : 27.2401 |  |  |  |  |
|  | NCELL_5 : 27.2401 |  |  |  |  |
| 225 |  | 352 | 23C/16 | −12.08 | 11.55 |
|  | OWN_CELL : 53.6718 |  |  |  |  |
|  | NCELL_4 : 46.3282 |  |  |  |  |
|  | NCELL_3 : 41.5887 |  |  |  |  |
|  | NCELL_5 : 41.5887 |  |  |  |  |
|  | NCELL_1 : 16.4494 |  |  |  |  |
|  | NCELL_2 : 16.4494 |  |  |  |  |

At sample 225 own cell is above 50%. This means that the fuzzy logic system would not have initiated handover here but most certainly at the next sample, since neighbour cell N4 is getting stronger and own cell is getting weaker.

| 231 |  | 352 | 24A/85 | −12.07 | 11.51 |
|---|---|---|---|---|---|
|  | NCELL_2 : 62.18 |  |  |  |  |
|  | OWN_CELL : 37.82 |  |  |  |  |
|  | NCELL_1 : 30.8414 |  |  |  |  |
|  | NCELL_4 : 28.6345 |  |  |  |  |
|  | NCELL_5 : 25.7863 |  |  |  |  |
|  | NCELL_3 : 25.4234 |  |  |  |  |
| 232 |  | 352 | 24A/35 | −12.07 | 11.5 |
|  | NCELL_2 : 59.45 |  |  |  |  |
|  | OWN_CELL : 40.55 |  |  |  |  |
|  | NCELL_1 : 30.8414 |  |  |  |  |
|  | NCELL_4 : 28.6345 |  |  |  |  |
|  | NCELL_3 : 25.4234 |  |  |  |  |
|  | NCELL_5 : 25.4234 |  |  |  |  |

At sample 231 measurements for new neighbour cells arrive and exactly as the locating algorithm our fuzzy logic system for locating comes to the conclusion that a handover to cell N2 is in order. Since congestion mares it impossible to actually make handover our candidate list for handover is correct for sample 232 to sample 241 where handover is made.

| 360 |  | 352 | 24C/121 | −11.78 | 10.61 |
|---|---|---|---|---|---|
|  | OWN_CELL : 50.005 |  |  |  |  |
|  | NCELL_1 : 49.995 |  |  |  |  |
|  | NCELL_2 : 40.296 |  |  |  |  |
|  | NCELL_4 : 16.685 |  |  |  |  |
|  | NCELL_3 : 11.3189 |  |  |  |  |
|  | NCELL_5 : 11.3189 |  |  |  |  |
| 361 |  | 352 | 24C/121 | −11.78 | 10.61 |
|  | OWN_CELL : 50.005 |  |  |  |  |
|  | NCELL_1 : 49.995 |  |  |  |  |
|  | NCELL_2 : 40.296 |  |  |  |  |
|  | NCELL_4 : 16.685 |  |  |  |  |
|  | NCELL_3 : 11.3189 |  |  |  |  |
|  | NCELL_5 : 11.3189 |  |  |  |  |

This (at sample 361) is a common signal strength handover situation. You can see how close the system is to initiate a handover.

| 556 |  | 352 | 24A/85 | −11.15 | 9.37 |
|---|---|---|---|---|---|
|  | OWN_CELL : 52.9439 |  |  |  |  |

-continued

|  | NCELL_5 : 47.0561 |  |  |  |  |
|---|---|---|---|---|---|
|  | NCELL_1 : 43.0004 |  |  |  |  |
|  | NCELL_2 : 33.8213 |  |  |  |  |
|  | NCELL_3 : 32.4619 |  |  |  |  |
|  | NCELL_4 : 24.0519 |  |  |  |  |
| 557 |  | 352 | 24A/85 | −11.15 | 9.37 |
|  | OWN_CELL : 52.9439 |  |  |  |  |
|  | NCELL_5 : 47.0561 |  |  |  |  |
|  | NCELL_1 : 43.0004 |  |  |  |  |
|  | NCELL_2 : 33.8213 |  |  |  |  |
|  | NCELL_3 : 31.0096 |  |  |  |  |
|  | NCELL_4 : 21.9543 |  |  |  |  |
| 558 |  | 352 | 24A/85 | −11.15 | 9.36 |
|  | NCELL_5 : 53.6168 |  |  |  |  |
|  | OWN_CELL : 46.3832 |  |  |  |  |
|  | NCELL_1 : 49.9593 |  |  |  |  |
|  | NCELL_2 : 45.4713 |  |  |  |  |
|  | NCELL_3 : 43.6428 |  |  |  |  |
|  | NCELL_4 : 34.0246 |  |  |  |  |

A hit! The quality of the communication has deteriorated to the point where a handover has to be made. The system comes to exactly the same conclusion as the locating algorithm used in the SPS, and a handover is initiated to cell N5.

| 583 |  | 352 | 23C/11 | −11.07 | 9.21 |
|---|---|---|---|---|---|
|  | OWN_CELL : 54.9942 |  |  |  |  |
|  | NCELL_5 : 45.0058 |  |  |  |  |
|  | NCELL_4 : 42.3031 |  |  |  |  |
|  | NCELL_3 : 36.5247 |  |  |  |  |
|  | NCELL_1 : 24.9404 |  |  |  |  |
|  | NCELL_2 : 24.9404 |  |  |  |  |
| 584 |  | 352 | 23C/11 | −11.06 | 9.2 |
|  | NCELL_5 : 52.9141 |  |  |  |  |
|  | NCELL_4 : 51.3213 |  |  |  |  |
|  | OWN_CELL : 47.0859 |  |  |  |  |
|  | NCELL_3 : 47.3301 |  |  |  |  |
|  | NCELL_1 : 32.2786 |  |  |  |  |
|  | NCELL_2 : 32.2786 |  |  |  |  |

A hit again! Handover is initiated to cell N5.

| 590 |  | 352 | 24B/48 | −11.04 | 9.17 |
|---|---|---|---|---|---|
|  | OWN_CELL : 51.212 |  |  |  |  |
|  | NCELL_1 : 48.788 |  |  |  |  |
|  | NCELL_2 : 35.6409 |  |  |  |  |
|  | NCELL_3 : 35.6409 |  |  |  |  |
|  | NCELL_4 : 23.7905 |  |  |  |  |
|  | NCELL_5 : 23.7905 |  |  |  |  |
| 591 |  | 352 | 24B/48 | −11.04 | 9.16 |

-continued

|     |              |         | 352 | 24B/48 | −11.04 | 9.16 |
|-----|--------------|---------|-----|--------|--------|------|
|     | OWN_CELL :   | 51.212  |     |        |        |      |
|     | NCELL_1 :    | 48.788  |     |        |        |      |
|     | NCELL_3 :    | 36.9846 |     |        |        |      |
|     | NCELL_2 :    | 35.6409 |     |        |        |      |
|     | NCELL_4 :    | 23.7905 |     |        |        |      |
|     | NCELL_5 :    | 23.7905 |     |        |        |      |
| 592 |              |         | 352 | 24B/48 | −11.04 | 9.16 |
|     | OWN_CELL :   | 51.212  |     |        |        |      |
|     | NCELL_1 :    | 48.788  |     |        |        |      |
|     | NCELL_3 :    | 38.2396 |     |        |        |      |
|     | NCELL_2 :    | 35.6409 |     |        |        |      |
|     | NCELL_4 :    | 23.7905 |     |        |        |      |
|     | NCELL_5 :    | 23.7905 |     |        |        |      |
| 593 |              |         | 352 | 24B/48 | −11.03 | 9.15 |
|     | OWN_CELL :   | 51.212  |     |        |        |      |
|     | NCELL_1 :    | 48.788  |     |        |        |      |
|     | NCELL_3 :    | 38.2396 |     |        |        |      |
|     | NCELL_2 :    | 34.1987 |     |        |        |      |
|     | NCELL_4 :    | 23.7905 |     |        |        |      |
|     | NCELL_5 :    | 23.7905 |     |        |        |      |
| 594 |              |         | 352 | 24B/48 | −11.03 | 9.14 |
|     | NCELL_1 :    | 54.6901 |     |        |        |      |
|     | OWN_CELL :   | 45.3099 |     |        |        |      |
|     | NCELL_3 :    | 47.4029 |     |        |        |      |
|     | NCELL_2 :    | 44.9385 |     |        |        |      |
|     | NCELL_4 :    | 31.2742 |     |        |        |      |
|     | NCELL_5 :    | 31.2742 |     |        |        |      |

The system is truly great! Once again it manages to point out the exact sample for initiating handover, this time to cell No. 1. Note that cells with extremely bad signal strength are ranked below own cell. That is because BER=58 is regarded as very bad but not that bad.

|     |              |         | 352 | 24B/88 | −11.01 | 9.11 |
|-----|--------------|---------|-----|--------|--------|------|
| 600 |              |         | 352 | 24B/88 | −11.01 | 9.11 |
|     | NCELL_3 :    | 53.6857 |     |        |        |      |
|     | NCELL_5 :    | 52.3017 |     |        |        |      |
|     | NCELL_4 :    | 51.7927 |     |        |        |      |
|     | OWN_CELL :   | 46.3143 |     |        |        |      |
|     | NCELL_1 :    | 48.8624 |     |        |        |      |
|     | NCELL_2 :    | 42.2439 |     |        |        |      |

Another correct decision, i.e. handover to cell No 3.

| 606 |              |         | 352 | 21B/114 | −10.99 | 9.07 |
|-----|--------------|---------|-----|---------|--------|------|
|     | OWN_CELL :   | 51.469  |     |         |        |      |
|     | NCELL_5 :    | 48.531  |     |         |        |      |
|     | NCELL_3 :    | 47.0725 |     |         |        |      |
|     | NCELL_2 :    | 42.6104 |     |         |        |      |
|     | NCELL_1 :    | 28.39   |     |         |        |      |
|     | NCELL_4 :    | 28.39   |     |         |        |      |
| 607 |              |         | 352 | 21B/114 | −10.99 | 9.07 |
|     | NCELL_5 :    | 66.4246 |     |         |        |      |
|     | NCELL_3 :    | 66.0021 |     |         |        |      |
|     | NCELL_2 :    | 61.1044 |     |         |        |      |
|     | OWN_CELL :   | 33.5754 |     |         |        |      |
|     | NCELL_1 :    | 47.1069 |     |         |        |      |
|     | NCELL_4 :    | 47.1069 |     |         |        |      |

Again! i.e. handover to cell N5.

| 638 |              |         | 352 | 24A/85 | −10.89 | 8.88 |
|-----|--------------|---------|-----|--------|--------|------|
|     | OWN_CELL :   | 53.7368 |     |        |        |      |
|     | NCELL_1 :    | 46.2632 |     |        |        |      |
|     | NCELL_5 :    | 42.939  |     |        |        |      |
|     | NCELL_3 :    | 40.0501 |     |        |        |      |
|     | NCELL_2 :    | 32.3664 |     |        |        |      |
|     | NCELL_4 :    | 30.7448 |     |        |        |      |
| 639 |              |         | 352 | 24A/85 | −10.89 | 8.87 |
|     | NCELL_1 :    | 52.2522 |     |        |        |      |
|     | NCELL_5 :    | 50.1162 |     |        |        |      |

-continued

|     |              |         |     |        |        |      |
|-----|--------------|---------|-----|--------|--------|------|
|     | OWN_CELL :   | 47.7478 |     |        |        |      |
|     | NCELL_3 :    | 48.8903 |     |        |        |      |
|     | NCELL_4 :    | 43.4498 |     |        |        |      |
|     | NCELL_2 :    | 42.4818 |     |        |        |      |

Correct decision again, i.e. handover to cell No 1.

| 732 |              |         | 352 | 24B/46 | −10.63 | 8.3  |
|-----|--------------|---------|-----|--------|--------|------|
|     | OWN_CELL :   | 54.8702 |     |        |        |      |
|     | NCELL_3 :    | 45.1298 |     |        |        |      |
|     | NCELL_1 :    | 43.089  |     |        |        |      |
|     | NCELL_2 :    | 26.8385 |     |        |        |      |
|     | NCELL_4 :    | 21.0433 |     |        |        |      |
|     | NCELL_5 :    | 18.7886 |     |        |        |      |
| 733 |              |         | 352 | 24B/46 | −10.63 | 8.3  |
|     | OWN_CELL :   | 54.8702 |     |        |        |      |
|     | NCELL_3 :    | 45.1298 |     |        |        |      |
|     | NCELL_1 :    | 43.089  |     |        |        |      |
|     | NCELL_2 :    | 26.8385 |     |        |        |      |
|     | NCELL_4 :    | 21.0433 |     |        |        |      |
|     | NCELL_5 :    | 18.7886 |     |        |        |      |
| 734 |              |         | 352 | 24B/46 | −10.62 | 8.29 |
|     | NCELL_3 :    | 57.6452 |     |        |        |      |
|     | NCELL_1 :    | 54.306  |     |        |        |      |
|     | OWN_CELL :   | 42.3548 |     |        |        |      |
|     | NCELL_2 :    | 44.7833 |     |        |        |      |
|     | NCELL_4 :    | 43.8268 |     |        |        |      |
|     | NCELL_5 :    | 41.6579 |     |        |        |      |
| 735 |              |         | 352 | 24B/46 | −10.62 | 8.29 |
|     | NCELL_3 :    | 75.7117 |     |        |        |      |
|     | NCELL_1 :    | 75.1906 |     |        |        |      |
|     | NCELL_2 :    | 65.6465 |     |        |        |      |
|     | NCELL_4 :    | 65.6465 |     |        |        |      |
|     | NCELL_5 :    | 64.4607 |     |        |        |      |
|     | OWN_CELL :   | 24.2883 |     |        |        |      |

The fuzzy logic system comes to exactly the same conclusion as the real locating algorithm i.e. handover should be initiated to cell No. 3. Since handover is impossible at sample 734 due to congestion the candidate list is correct also for sample 735.

| 741 |              |         | 352 | 24B/85 | −10.6  | 8.25 |
|-----|--------------|---------|-----|--------|--------|------|
|     | OWN_CELL :   | 52.3023 |     |        |        |      |
|     | NCELL_5 :    | 47.6977 |     |        |        |      |
|     | NCELL_3 :    | 36.0648 |     |        |        |      |
|     | NCELL_1 :    | 34.8835 |     |        |        |      |
|     | NCELL_2 :    | 22.0241 |     |        |        |      |
|     | NCELL_4 :    | 17.4087 |     |        |        |      |
| 742 |              |         | 352 | 24A/85 | −10.6  | 8.25 |
|     | OWN_CELL :   | 53.6551 |     |        |        |      |
|     | NCELL_5 :    | 46.3449 |     |        |        |      |
|     | NCELL_1 :    | 36.0187 |     |        |        |      |
|     | NCELL_3 :    | 34.772  |     |        |        |      |
|     | NCELL_2 :    | 23.1672 |     |        |        |      |
|     | NCELL_:4     | 12.9356 |     |        |        |      |
| 743 |              |         | 352 | 24A/85 | −10.6  | 8.24 |
|     | OWN_CELL :   | 54.4077 |     |        |        |      |
|     | NCELL_5 :    | 45.5923 |     |        |        |      |
|     | NCELL_1 :    | 36.0565 |     |        |        |      |
|     | NCELL_3 :    | 34.5645 |     |        |        |      |
|     | NCELL_2 :    | 22.8537 |     |        |        |      |
|     | NCELL_4 :    | 8.19036 |     |        |        |      |
| 744 |              |         | 352 | 24A/85 | −10.6  | 8.23 |
|     | OWN_CELL :   | 54.4077 |     |        |        |      |
|     | NCELL_5 :    | 45.5923 |     |        |        |      |
|     | NCELL_1 :    | 36.0565 |     |        |        |      |
|     | NCELL_3 :    | 35.3417 |     |        |        |      |
|     | NCELL_2 :    | 22.8537 |     |        |        |      |
|     | NCELL_4 :    | 8.19036 |     |        |        |      |
| 745 |              |         | 352 | 24A/85 | −10.59 | 8.23 |
|     | OWN_CELL :   | 53.1899 |     |        |        |      |
|     | NCELL_5 :    | 46.8101 |     |        |        |      |

-continued

| | | | | | |
|---|---|---|---|---|---|
| | NCELL_1 : 35.3417 | | | | |
| | NCELL_3 : 35.3417 | | | | |
| | NCELL_2 : 20.2088 | | | | |
| | NCELL_4 : 10.3751 | | | | |
| 746 | | 352 | 24A/85 | −10.59 | 8.22 |
| | OWN_CELL : 53.6211 | | | | |
| | NCELL_5 : 46.3789 | | | | |
| | NCELL_1 : 36.0565 | | | | |
| | NCELL_3 : 35.3417 | | | | |
| | NCELL_2 : 22.8537 | | | | |
| | NCELL_4 : 10.3751 | | | | |
| 747 | | 352 | 24A/85 | −10.59 | 8.22 |
| | NCELL_5 : 50.3231 | | | | |
| | OWN_CELL : 49.6769 | | | | |
| | NCELL_1 : 35.5481 | | | | |
| | NCELL_3 : 34.3562 | | | | |
| | NCELL_2 : 23.4552 | | | | |
| | NCELL_4 : 14.1249 | | | | |

At sample 741 measurements from new cells are delivered. Cell No. 5 has got a real good signal strength but according to our membership functions the communication quality is not bad enough for a handover yet. The locating algorithm however, initiates an handover but it is impossible at sample 741 due to congestion. But at sample 752 the handover is made. In our system a handover is initiated at sample 747 due to quality deterioration. The handover is quite correct made to cell No. 5. This is a common signal strength handover. If the channel quality had not deteriorated our system would have prevented an unnecessary handover.

Depending on how the membership functions are constructed for each input measurement SSE, BER and SSN, the final candidate list is possible to adjust as to meet specific performance demands. With the membership functions that are used unnecessary handovers can also be prevented, for instance when the quality of the communication is good but a neighbour cell has got a little better signal strength.

The invention is not limited to the embodiments described but other embodiments are possible within the scope of the invention.

We claim:

1. A method for handing off a connection from a serving base station to a candidate base station in a mobile telecommunication system comprising the steps of:
   measuring at least two parameters of said telecommunications system;
   inputting said measured parameters to a fuzzy-logic system having fuzzy condition sets;
   executing the fuzzy condition sets using the measured parameters;
   weighing consequences from the executed fuzzy condition sets to generate at least one crisp value;
   establishing at least one list of handoff candidates having a ranking constructed from the at least one crisp value; and
   handing off said connection from said serving base station to said candidate base station chosen from said list of handoff candidates based on the at least one crisp value.

2. The handoff method of claim 1, further comprising the steps of:
   forming at least two parameter groups;
   forming and executing at least one fuzzy condition set for each parameter group; and
   using crisp values from said fuzzy condition sets to make said handoff.

3. The handoff method of claim 2, wherein said step of forming at least two parameter groups further comprises the step of:
   forming one of said at least two parameter groups using parameters related to at least two of:
      a strength of signals received at a mobile station from said serving base station, a strength of signals received at base stations, and a strength of signals received at said mobile station from base stations in cells neighboring said current cell.

4. The handoff method of claim 3, wherein said step of forming at least two parameter groups further comprises the step of:
   forming one of said at least two parameter groups using parameters derived from said strength of signals received at said mobile station and said strength of signals received at said base stations.

5. The handoff method of claim 1, further comprising the step of:
   including information relating to an approximate available communication capacity of handoff candidates in the at least one candidate list.

6. The handoff method of claim 1, further comprising the step of:
   updating said at least one candidate list using said at least one crisp value.

7. A method for handing off a connection from a serving base station to a candidate base station in a mobile telecommunication system comprising the steps of:
   measuring at least two parameters of said telecommunications system;
   inputting said measured parameters to a fuzzy-logic system having fuzzy condition sets;
   executing the fuzzy condition sets using both a most recently determined set of said measured parameters and an earlier determined set of said measured parameters;
   weighing both consequences obtained from executing the fuzzy condition sets using said most recently determined measured parameters and consequences obtained from executing the fuzzy condition sets using said earlier determined measured parameters to generate at least one crisp value; and
   handing off said connection from said serving base station to said candidate base station based on the at least one crisp value.

8. A circuit for updating a handoff candidate list used in a radiocommunication system comprising:
   a data buffer for receiving parameters associated with values measured by a mobile station and with values measured by at least one base station;
   a fuzzy logic circuit for processing said received parameters using rules to compare set membership of said received parameters and select at least one membership for at least one output data function;
   a weighing circuit for determining a crisp output based upon received values of said at least one membership of said at least one output data function;
   an evaluation circuit for using said crisp output to update said handoff candidate list; and
   a processor for coordinating operations of said data buffer, said fuzzy logic circuit, said weighing circuit and said evaluation circuit.

9. A circuit for analyzing handoff candidates comprising:
   a data buffer for receiving first, second and third parameters based upon:

(1) signal strength measured by a mobile station on a first downlink transmitted by a first base station;
(2) signal strength measured by said mobile station on a second downlink transmitted by a second base station; and
(3) bit error rate measured by said mobile station on at least said first downlink, respectively;

a fuzzy logic circuit for classifying said received first and second parameters using a set of signal strength membership functions and said received third parameter using a set of bit error rate membership functions;

wherein said fuzzy logic circuit also includes means for applying a set of rules to said classified parameters and generating at least one consequence;

a circuit which receives said at least one consequence and determines a crisp output based upon said consequence; and a device which uses said crisp output to update a candidate list and determine if a handoff to one of the candidates on said candidate list will be performed.

* * * * *